(12) United States Patent  (10) Patent No.: US 8,984,004 B2
Oku  (45) Date of Patent: Mar. 17, 2015

(54) INFORMATION COLLECTING SYSTEM

(75) Inventor: Masaharu Oku, Tokorozawa (JP)

(73) Assignee: smart-FOA, Tokorozawa-shi, Saitama (JP)

( * ) Notice: Subject to any disclaimer, the term of this patent is extended or adjusted under 35 U.S.C. 154(b) by 536 days.

(21) Appl. No.: 13/410,065

(22) Filed: Mar. 1, 2012

(65) Prior Publication Data

US 2012/0290613 A1   Nov. 15, 2012

(30) Foreign Application Priority Data

May 9, 2011   (JP) .................................. 2011-104532
Oct. 31, 2011   (JP) .................................. 2011-238305

(51) Int. Cl.
*G06F 17/30*  (2006.01)
*G06F 7/00*  (2006.01)
*G06Q 10/06*  (2012.01)

(52) U.S. Cl.
CPC .......... *G06Q 10/06* (2013.01); *G06F 17/30312* (2013.01)
USPC ....................................................... 707/770

(58) Field of Classification Search
CPC ............................................... G06F 17/30312
USPC ....................................................... 707/770
See application file for complete search history.

(56) References Cited

U.S. PATENT DOCUMENTS

| 6,611,755 B1 * | 8/2003 | Coffee et al. ................. 701/482 |
| 6,778,986 B1 * | 8/2004 | Stern et al. ............. 707/999.005 |
| 6,862,521 B1 * | 3/2005 | Fox ............................... 701/468 |
| 6,993,576 B1 * | 1/2006 | Labedz et al. ................ 709/223 |
| 7,391,326 B2 * | 6/2008 | Puzio et al. ................ 340/572.1 |
| 7,606,919 B2 * | 10/2009 | Labedz et al. ................ 709/229 |
| 2006/0265267 A1 * | 11/2006 | Chen et al. ........................ 705/9 |
| 2007/0233547 A1 * | 10/2007 | Younger et al. ................... 705/9 |
| 2008/0065456 A1 * | 3/2008 | Labedz et al. .................... 705/8 |
| 2010/0256912 A1 * | 10/2010 | Nielsen et al. .................... 702/2 |

FOREIGN PATENT DOCUMENTS

JP   2006-164182   6/2006

* cited by examiner

*Primary Examiner* — Pavan Mamillapalli

(57) ABSTRACT

An information collecting system includes a dictionary defining the kinds of each supporting information to be added to job-site data and a database of the supporting information. The supporting information is background information including pieces of information indicating an analysis assist material affecting an analysis and an evaluation assist material affecting an evaluation of an analysis result. That is, the job-site data is included as a factor in a fishbone diagram having a shared knowledge of an organization or an organization knowledge as a characteristic, and the background information is other factors in the fishbone diagram including the job-site data as a factor. Each supporting information is searched from the database in accordance with a dictionary, and each searched supporting information is added to the job-site data in addition to attribute data to generate event information.

16 Claims, 16 Drawing Sheets

FIG. 8

| Gp — GENERATED PLACE INFORMATION (DIVISION-NATION-FACTORY-PROCESS-DEVICE) | Ec — EVENT KIND | Sc — SUPPORTING KIND INFORMATION | | | | | Ad — TRANSMISSION-DESTINATION INFORMATION |
|---|---|---|---|---|---|---|---|
| M | IM1 | KIND (1) | KIND (2) | KIND (3) | KIND (4) | | FWS1 |
| M | IM2 | KIND (1) | KIND (2) | KIND (4) | KIND (6) | | ...... |
| M | IM3 | KIND (1) | KIND (2) | KIND (4) | KIND (5) | | |
| M | ...... | ...... | ...... | ...... | ...... | | |
| M | IM251 | ...... | ...... | ...... | ...... | | |

INFORMATION COLLECTING SYSTEM

FIELD OF THE INVENTION

The present invention relates to an information collecting system that collects job-site data generated at a factory, an office, etc.

BACKGROUND OF THE INVENTION

Various facilities are operated in a factory, an office, etc. These facilities output job-site data indicating observation results to the facilities, works, or materials, such as error information and status information. The job-site data may be input by a user. The user connects a mobile terminal to the facility, etc, and uses the mobile terminal as a user interface to input job-site data. The job-site data is typically output in a coded manner or as values indicating an observation result. The facility or a computer managing the facility adds attribute data to such job-site data. The attribute data indicates a characteristic and a feature directly possessed by the observation result. Specific examples thereof are information on a place where the observation result was obtained and a date when the observation result was obtained. Information obtained by adding the attribute data to the job-site data is monitored as event information by an administrator. A fixed property administrator is a person responsible for improvement or a person responsible for maintenance and management of the facility in a factory, and is a person or an administrator responsible for various functional divisions, such as an administrator of a server device.

The event information is important since it attributes to the operation management of a factory or an office, the quality control of products, and the business operation of a company, etc. However, the event information directly output by the facility only indicates a code or a simple observed value, and attributes, such as a place where an event occurred and a date when the event occurred, and has no secondary or tertiary meanings. Hence, for many years, the event information is interpreted and evaluated at each hierarchy from a job-site level to a management and business operation level, and the event information is utilized for each level.

Accordingly, there is often a time lag between the job-site level and the management and business operation level to transmit information, and the job-site level and the management and business operation level are isolated from each other from the standpoint of information transmission. Moreover, even if information is received, it is necessary to interpret and evaluate the meaning of such information in combination of other various pieces of information. Therefore, there is also a time lag from the generation of event information to the recognition of the value thereof. Furthermore, the interpretation and evaluation of the meaning of the information is duplicated for individual persons, and a quick response based on the event information is often delayed.

Hence, various information collecting systems are proposed so far. For example, JP 2006-164182 A discloses an information collecting system which generally stores event information once in a database, and information necessary for the interpretation and evaluation of the event information is collected from the database together with the stored event information for each division. Those pieces of information are combined together at each division to interpret the secondary and tertiary meanings of the event information.

According to such an information collecting system, the job-site level and the management and business operation level can obtain the same event information simultaneously.

However, as explained above, the event information generated at a facility has no meaning other than an observation result and an attribute. Hence, each person responsible for recognizing the meaning of the event information needs to repeat interpretation of the obtained event information. That is, the event information needs to be interpreted while other information is added thereto, a new interpretation obtained through such interpretation is added to further other information, and this procedure is repeated to give various meanings to the event information step by step.

For example, when job-site data indicating a yield is obtained from a facility, interpretation must be repeated step by step without a delay, such as, whether or not the yield indicates the abnormality of the facility; if it indicates the abnormality, whether the abnormality is caused by a consumable part or not; if it is caused by the consumable part, where the consumable part is stocked; if the consumable part is taken out from the stock, whether or not restocking is necessary; and if the restocking is necessary, from which company the consumable part is purchased, while other information like a communication to an important customer of the delay of delivery is added to the event information.

Accordingly, the information collecting system can deliver the event information to individual divisions without a time lag, but the necessary time for interpreting the event information varies depending on the divisions. Hence, a time lag is unavoidable for the recognition of the event information between the job-site level and the management and business operation level, resulting in a still-unsolved isolation between the job-site level and the management and business operation level from the standpoint of recognition of information.

The present invention has been made to address the above-explained problem of the related art. An object of the present invention is to provide an information collecting system that enables instantaneous understanding to the secondary and tertiary meanings of event information generated at a job site.

SUMMARY OF THE INVENTION

A first aspect of the present invention provides an information collecting system that is connected to, via a network, a data generating device which adds attribute data to generated job-site data and which transmits the job-site data with the attribute data to the network. The information collecting system includes: a dictionary storing unit that stores a dictionary which defines a kind of each supporting information to be added to the job-site data; a database that stores pieces of supporting information of various kinds and various contents; a searching unit that searches each supporting information from the database in accordance with the dictionary; and a primary reconfiguring unit that adds the searched supporting information to the job-site data in addition to the attribute data to reconfigure event information. The supporting information is background information that includes at least one among pieces of information respectively indicating an editing assist material which is necessary for editing the job-site data, a comparison target data to be compared with the job-site data, an analysis assist material which affects an analysis and an evaluation assist material which affects an evaluation on an analysis result.

The job-site data is a characteristic in a fishbone diagram, and the background information is a factor in the fishbone diagram which includes the job-site data as the characteristic. From the other side of the view, the job-site data is included as a factor in a fishbone diagram having knowledge as a characteristic, and the background information is other factors in the fishbone diagram including the job-site data as a factor.

The dictionary storing unit defines supporting information for a direct division available to a job-site level where the data generating device is placed. The dictionary storing unit further defines supporting information for an indirect division indirectly derived from the job-site data and available to various management levels that manage a business activity, and supporting information for a business determination available to a business operation level. The event information is reconfigured by the searching unit and the primary reconfiguring unit, by being added with the supporting information for the direct division, the supporting information for the indirect division, and the supporting information for a business determination.

Hence, the event information seems to be generated with a set of necessary and sufficient information to reach a shared knowledge or an organization knowledge as viewed from the side of the user of the information collecting system. Therefore, the user can instantaneously understand the meaning of the job-site data in response to the generation of the job-site data.

The searching unit may search other kinds of supporting information with a search key that is a combination of the job-site data included in the event information reconfigured by the primary reconfiguring unit and each of the added supporting information. The primary reconfiguring unit may successively add the supporting information successively searched by the searching unit to the event information.

The information collecting system may further include: a receiving unit that is connected to a client terminal which requests collection of the event information via the network and receives each kind of the supporting information from the client terminal; a secondary reconfiguring unit that extracts the job-site data and each kind of the supporting information received by the receiving unit from the event information reconfigured by the primary reconfiguring unit to reconfigure new event information; an event information storing unit that stores the event information reconfigured by the secondary reconfiguring unit in association with the client terminal; and a transmitting unit that transmits the event information stored in the event information storing unit.

Hence, as viewed from a side where the client terminal is operated, it seems as if event information directly describing necessary contents in an understandable manner is generated. Therefore, the secondary and tertiary meanings of the event information are understandable at a time point when the event information just arrives without an interpretation of work. Accordingly, a time lag in arrival of the event information can be eliminated throughout the hierarchy from the job-site level to the management and business operation level, and a time lag in understanding of the event information is also eliminated.

A second aspect of the present invention provides an information collecting system which includes a dictionary managing device, a plurality of domain managing devices, a plurality of primary reconfiguring devices, and a plurality of secondary reconfiguring devices, and which is connected to, via a network, a plurality of data generating devices that generate job-site data and a plurality of client terminals that request collection of event information. The dictionary managing device includes: a managing unit that stores a dictionary recording all models of all event information derived from the job-site data output by all data generating devices; a dictionary generating unit that adds, for each domain managing device, a reference mask to some models in the dictionary stored in the managing unit in order to generate an individual dictionary for each domain managing device; and a transmitting unit that distributes the corresponding dictionary added with the reference mask to the domain managing device. The domain managing device includes a display control unit that causes the predetermined client terminal to display the model which is included in the distributed dictionary and which is not hidden by the reference mask and causes the client terminal to generate collection condition information for the event information based on the displayed model. The primary reconfiguring unit includes a searching unit that searches the supporting information from a database in accordance with the model included in the dictionary and a primary reconfiguring unit that adds the searched supporting information to the job-site data to reconfigure the event information, and searches other kinds of supporting information with search keys that are the job-site data and the supporting information included in the event information reconfigured by the primary reconfiguring unit, and successively adds the successively searched supporting information to the event information. The secondary reconfiguring unit includes a secondary reconfiguring unit that extracts some of information from the event information reconfigured by the primary reconfiguring unit in accordance with the collection condition information to generate newly reconfigured event information and a transmitting unit that transmits the event information reconfigured by the secondary reconfiguring unit to the client terminal.

According to the second aspect of the present invention, event information circulating the network is not encoded and an access authority to the storage storing such information is not set but a dictionary to be a recipe for generating event information is masked, thereby making the masked portion invisible to a user. Hence, it is unnecessary to encode each event information or to set a restriction for reading of such information, but bare information can circulate the network as it is, and the user does not perceive the restriction of information. Therefore, the concept of information sharing can be maintained.

BRIEF DESCRIPTION OF THE DRAWINGS

FIG. 8 is an exemplary diagram showing a dictionary stored in a dictionary memory unit;

DETAILED DESCRIPTION OF THE EMBODIMENTS

An explanation will be given in detail of an information collecting system according to an embodiment of the present invention with reference to the accompanying drawings.

<1. General Configuration>
<Network Configuration>

Figure 1:
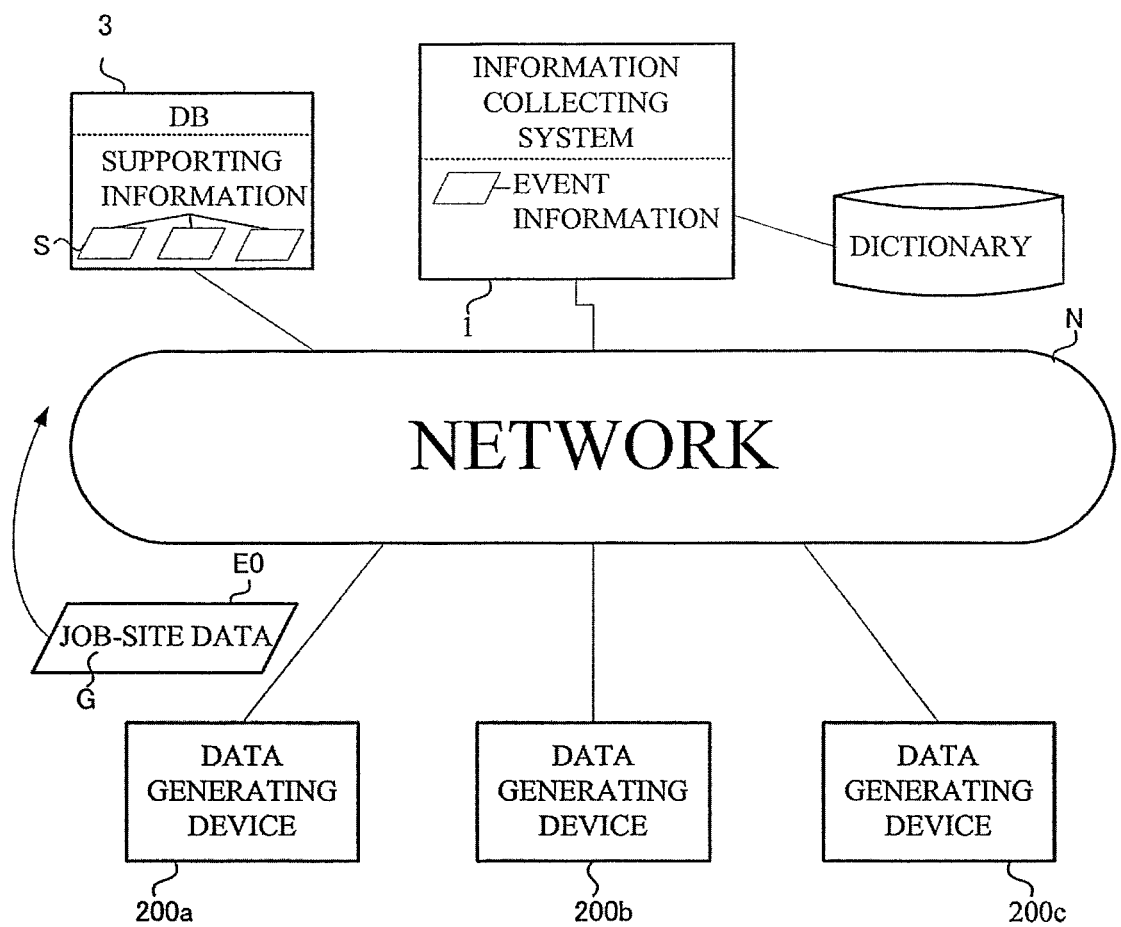
FIG. 1 is a block diagram showing a network configuration including an information collecting system according to an embodiment of the present invention.

FIG. 1 is a block diagram showing a network configuration including an information collecting system 1 according to an embodiment. The information collecting system 1 is connected to a network N. Further connected to the network N are a database 3, and one or more data generating devices 200a, 200b, and 200c, etc.

The information collecting system 1, the database 3, and the data generating device 200 are each configured by a computer that includes an arithmetic control device (a CPU), a main memory device (a RAM), an external memory device (an HDD, etc,) having an OS and an application stored therein, and a network adapter.

The information collecting system 1 has a plurality of computers connected via the network. Moreover, the information collecting system 1 and the database 3 are a single computer or separate computers distributed over the network N. The data generating device 200 includes a computer and a facility like an FA operated in a factory or an office.

The network N conforms with a wired communication protocol like IEEE (Institute of Electrical and Electronic Engineers) 802.3, a wireless communication protocol like IEEE 802.11, and other protocols, and is a wired LAN network, a wireless LAN network, the Internet network, a communication line like an exclusive line, or a combination thereof.

In such a network N, the data generating device 200 generates job-site data G. The job-site data G includes an observation result to the facility, such as error information and status information, and attribute data of the observation result. The observation result is generated upon detection of various incidents by a sensor of the facility and an analysis process on such detection.

The data generating device 200 generates the job-site data G by adding attribute data to an observation result upon generation of the observation result. Next, the data generating device 200 adds a TCP or IP header including the IP address of the information collecting system 1 and the port number of an information collecting application to the job-site data G, and transmits the job-site data G to the network N. An example transmission timing of the job-site data G is a time point when an event occurs, and the job-site data G is temporarily stored for a certain period like a day in consideration of the usability of the job-site data G.

The job-site data G may be input by a user. The user connects a mobile terminal to the facility of the data generating device 200, and uses the mobile terminal as a user interface to input job-site data G.

Figure 2:
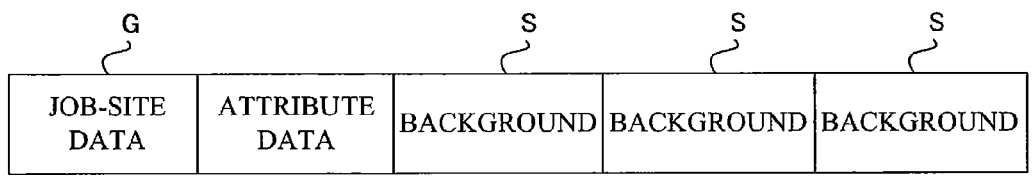
FIG. 2 is a conceptual diagram showing event information.

The information collecting system 1 adds various supporting information S to the job-site data G circulating the network N, thereby generating event information. That is, as shown in FIG. 2, the event information is successive pieces of data having the job-site data G added with pieces of supporting information S. The supporting information S is mainly background information of an event.

The attribute data is for specifying an incident that is the occurrence of an event. More specifically, the attribute data includes the kind of an observation result, a place where the event occurred and a date when the event occurred. In contrast, in the supporting information S, the background information is necessary to analyze and evaluate the event at each hierarchy in an organization, and adds meanings to the event information which cannot be derived from only the observation result and attribute data together with the job-site data G.

That is, the background information includes information indicating a processing assist material which is necessary for processing the job-site data G, a comparison material which is to be compared with the job-site data G, an analysis assist material affecting an analysis, and an evaluation assist material affecting an evaluation of an analysis result.

Figure 3:
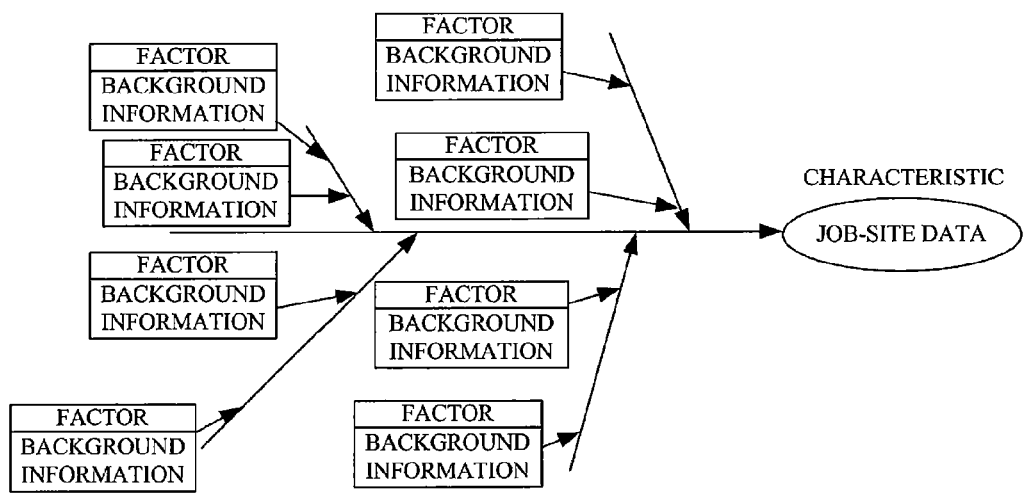
FIG. 3 is a first fishbone diagram for explaining job-site data and background information.

More specifically, primarily, as shown in FIG. 3, provided is a fishbone diagram having necessary parameter groups (factors) put together to reach the job-site data G. In this case, the factors is to be the background information.

Figure 4:
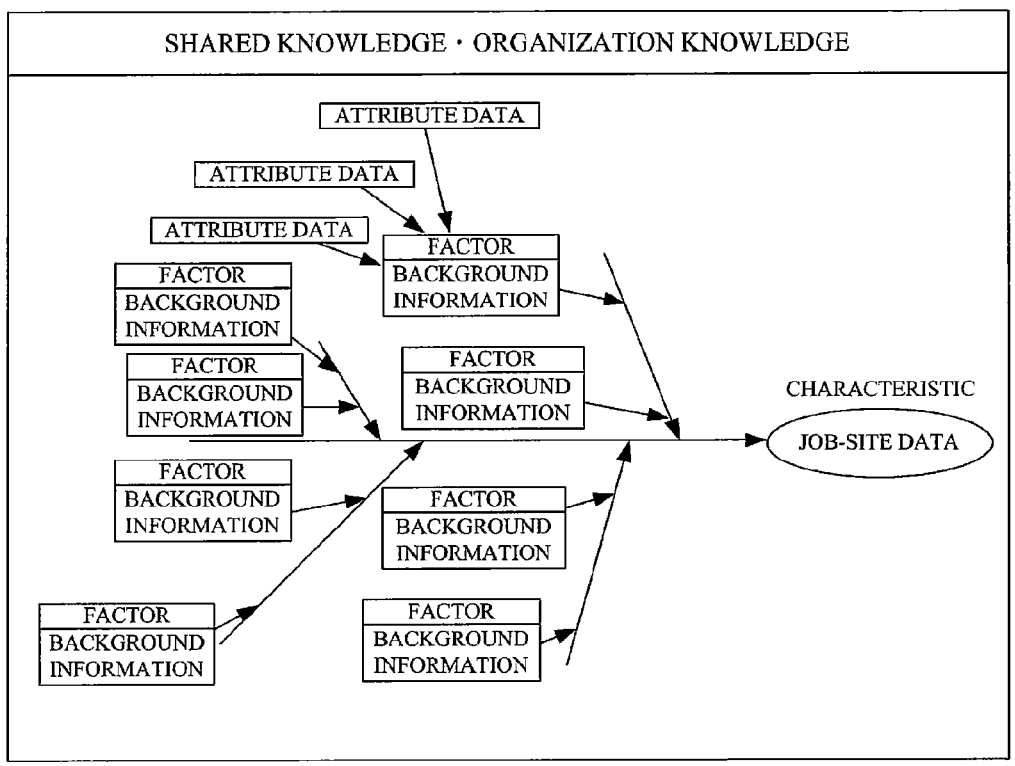
FIG. 4 is a second fishbone diagram for explaining job-site data and background information.

Furthermore, from the other side of the view, as shown in FIG. 4, provided is a fishbone diagram having necessary parameter groups (factors) put together to reach a knowledge (characteristics) in an organization, the job-site data G and the background information are also factors. Providing that one of such factors is job-site data G, the other factors to reach the characteristics are background information. Moreover, the fishbone diagram as a whole is a shared knowledge or organization knowledge.

In this fishbone diagram, the attribution data is an information having relation directly connected to the job-site data G via one straight line. In contrast, the background information is connected to the job-site data G indirectly via plural lines. In this point, the background information is distinguishable from the attribution data.

For example, the background information primarily indicates under what specification and standard works the job-site data G was generated, which worker did the work, what process was applied, and what manufacturing plan was executed to generate the job-site data G, etc. That is, the background information is a generation factor of the job-site data G.

Furthermore, another specific example will be explained. The data generating device 200 inspecting an external appearance of a part outputs the job-site data G. When the job-site data G includes an observation result that is an alert to the occurrence of a product failure, the information collecting system 1 adds background information, such as information on a surface temperature of a belt conveyer, information on an upper limit caution of the surface temperature, information on the upper limit standard of the surface temperature, information on a convey time by the belt conveyer, and operation mode information indicating an automatic or manual operation, to the job-site data G. Those pieces of background information cannot be obtained from the data generating device 200 inspecting the external appearance of the part. Instead, those pieces of background information are generated by the other data generating devices 200 and circulate the network N, or are stored in the database 3.

According to the event information including the job-site data G with the alert to the occurrence of a product failure as well as those pieces of background information, it is possible to reach a knowledge from the event information alone. In other words, it is possible to achieve one conclusion from only the event information. For example, the event information indicates the following information: the value indicated by the surface temperature information does not exceed the upper limit caution information and the upper limit standard information; the operation was changed into the manual mode; the convey time by the belt conveyer became long; a time period while heat was applied to the part became long; and therefore the defective part was produced. This event information resultantly gives the knowledge that it is not a serious problem necessary to do some actions urgently. That is, from "factors" such as a defective generation or the manual operation mode, it is possible to achieve "characteristic", that is the knowledge indicating the degree of necessity of the actions.

The information collecting system 1 has a dictionary prepared in advance. The dictionary stores models of various pieces of event information. The models are given with names corresponding to the event information, and each include information indicating the kind of the job-site data G to be included in the event information and information indicating the kind of supporting information S to be added to the job-site data G. The information collecting system 1 extracts the supporting information S from the database 3 with reference to the dictionary, and generates the event information.

The dictionary is generated based on the definitions of the models. At the time of giving such definition, that is, at the time of determining to which background information the job-site data G is linked and to which job-site data G the background information is linked, a person responsible for such linking does not need to select the kind of the background information in consideration of items for evaluating the job-site data G. The responsible person may simply consider what words appear together with the job site data G to explain the shared knowledge and the organization knowledge as general terms at a job site, and then select the kind of the word as the kind of the background information. The terms used at a job site are words understood by and familiar to all people involved in the manufacturing by a company, such as "the quantity of products", "work complete", "defect", "quality failure", "line stop", "operability", and "work start", etc. These words deeply reflect the history and culture of that company and the product to be produced, etc.

Hence, the words used in the manufacturing activity is modelized such that the words have strict definitions and become consistency without vagueness, and easy to handle as quantitative information. Various messages generated during the activity at the job site are picked up and sorted through a media that is the dictionary, and are organized systematically. Meanwhile, when the dictionary is generated, necessary explanation may be added to a model M, such as a person who registered information, a registration history, a use purpose, an initiating event, the meaning from the standpoint of a business operation, and any other necessary explanation.

That is, from the standpoint of a user of the information collecting system, it seems as if event information is generated which includes a whole set of necessary and sufficient information to reach the shared knowledge and organization knowledge as viewed from the side of the user of the information collecting system, and the meaning of the job-site data is instantaneously understandable in response to the generation of the job-site data.

<2. Specific Generation Method of Event Information>
<Network Configuration>

Figure 5:
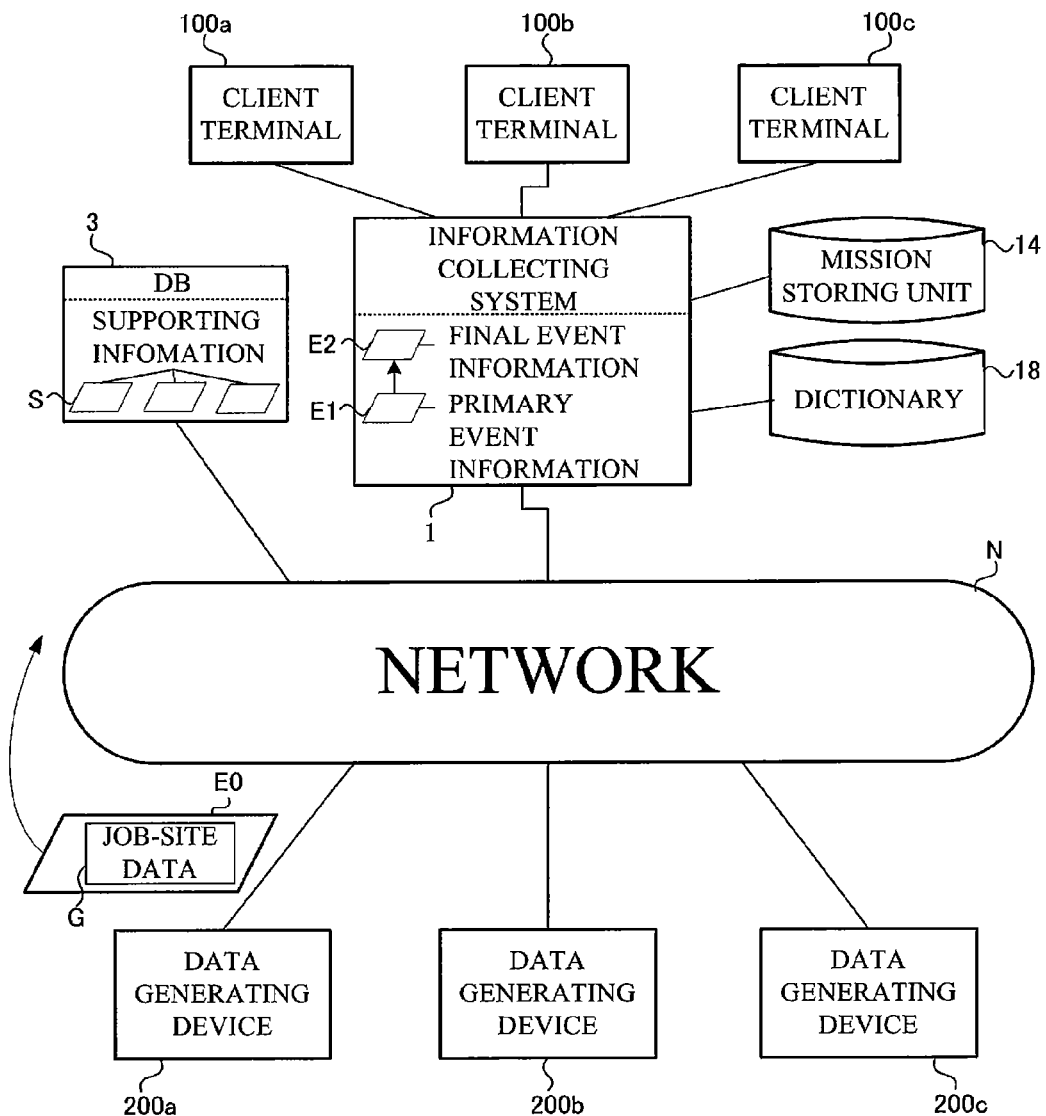
FIG. 5 is a block diagram showing the detail of the network configuration including the information collecting system.

As shown in FIG. 5, one or more client terminals 100a, 100b, and 100c, etc, are further connected to the network N. The information collecting system 1 further adds various pieces of supporting information S to the event information, thereby reconfiguring the event information, and sorts out the supporting information S so as to meet the request from the client terminal 100, thereby further reconfiguring event information E. The event information E is transmitted to the client terminal 100 in accordance with the TCP/IP protocol. The database 3 stores the various pieces of supporting information S for each kind and each content in association with the job-site data G, and other supporting information S. The information collecting system 1 operates as a database management system (DBMS) that searches the database 3, and obtains the supporting information S.

The supporting information S stored in the database 3 is not limited to supporting information S for a direct division which is available to the job-site level, but also supporting information S for an indirect division which is indirectly derived from the job-site data G and is available to various management levels for managing a business activity, and supporting information S for business determination available to a business operation level. Typical examples of the direct divisions are a manufacturing division and a manufacturing management division, and examples of the indirect divisions are individual divisions, such as general affairs, sales and marketing, accounting, and management. The database 3 may be an exclusive database for a company, or may be a server group over the Internet.

The event information transmitted from the data generating device 200 is referred to as primitive event information E0, the event information reconfigured by the information collecting system 1 that adds the supporting information S thereto is referred to as primary event information E1, and the event information transmitted to the client terminal 100 is referred to as final event information E2.

The supporting information S to be added to the primary event information E1 is searched in accordance with the dictionary of the information collecting system 1. The dictionary defines the supporting information S to be added to the job-site data G. In searching of the supporting information S, the contents of the job-site data G included in the primary event information E1 and the contents of the supporting information S already added are taken as search keys. The searched supporting information S is successively added to the primary event information E1. That is, the added supporting information S is further used as the search key for the other supporting information S. In other words, as various pieces of information for complementing the job-site data G are successively added to the primary event information E1, various search keys for searching the other supporting information S are also successively added.

The supporting information S to be sorted in and out for the final event information E2 follows collection condition information input from the client terminal 100. The collection condition information indicates the kind of the job-site data G requested so as to be collected, the kind of the supporting information S to be added to the final event information E, and the collection period of the job-site data G, etc.

<System Configuration>

Figure 6:
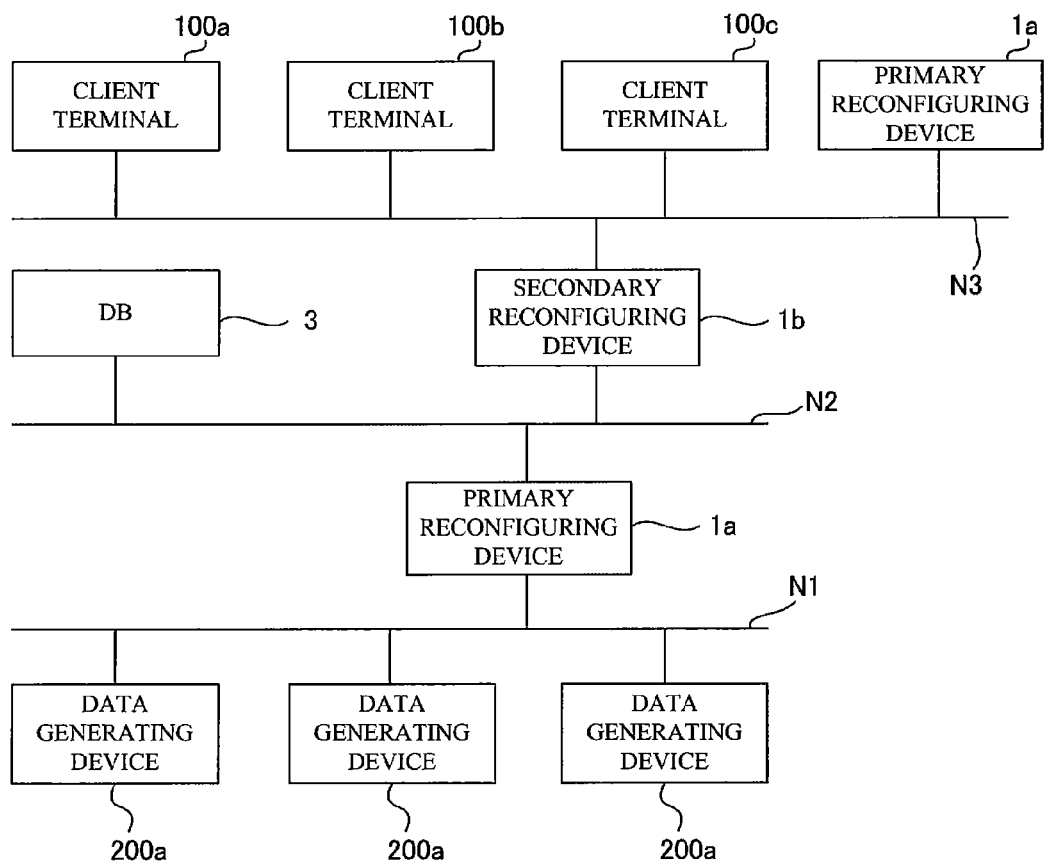
FIG. 6 is a block diagram showing a configuration of the information collecting system 1.

FIG. 6 is a block diagram showing a configuration of the information collecting system 1. As shown in FIG. 6, the information collecting system 1 includes a primary reconfiguring device 1a that generates the primary event information E1, a secondary reconfiguring device 1b that generates the final event information E2, and a domain managing device 1c which has a dictionary and supports generation of the collection condition information with reference to the dictionary. The primary reconfiguring device 1a, the secondary reconfiguring device 1b, and the domain managing device 1c are connected together via a network, see FIG. 7.

The primary reconfiguring device 1*a* is connected to the data generating devices 200*a*, 200*b*, and 200*c*, etc, via a lower network N1. Moreover, the primary reconfiguring device 1*a* is connected to an intermediate network N2. The secondary reconfiguring device 1*b* and the database 3 are further connected to the intermediate network N2. Furthermore, the secondary reconfiguring device 1*b* is connected to an upper network N3 where the client terminals 100*a*, 100*b*, and 100*c*, etc, and the domain managing device is are connected.

That is, the primary reconfiguring device 1*a* obtains the primitive event information E0 from the data generating device 200*a* via the lower network N1. Moreover, the primary reconfiguring device 1*a* obtains various pieces of supporting information S from the database 3 via the intermediate network N2.

The secondary reconfiguring device 1*b* obtains the primary event information E1 from the primary reconfiguring device 1*a* via the intermediate network N2. Moreover, the secondary reconfiguring device 1*b* receives a distributed dictionary from the domain managing device 1*c* via the upper network N3. Furthermore, the secondary reconfiguring device 1*b* receives the collection condition information from respective client terminals 100*a*, 100*b*, and 100*c*, etc, via the upper network N3, and transmits the secondary event information E2 to respective client terminals 100*a*, 100*b*, and 100*c*, etc.

The domain managing device 1*c* distributes the dictionary to the secondary reconfiguring device 1*b* via the upper network N3. Moreover, the domain managing device 1*c* causes respective client terminals 100*a*, 100*b*, and 100*c*, etc, to refer the dictionary via the upper network N3, and to create the collection condition information.

Figure 7:
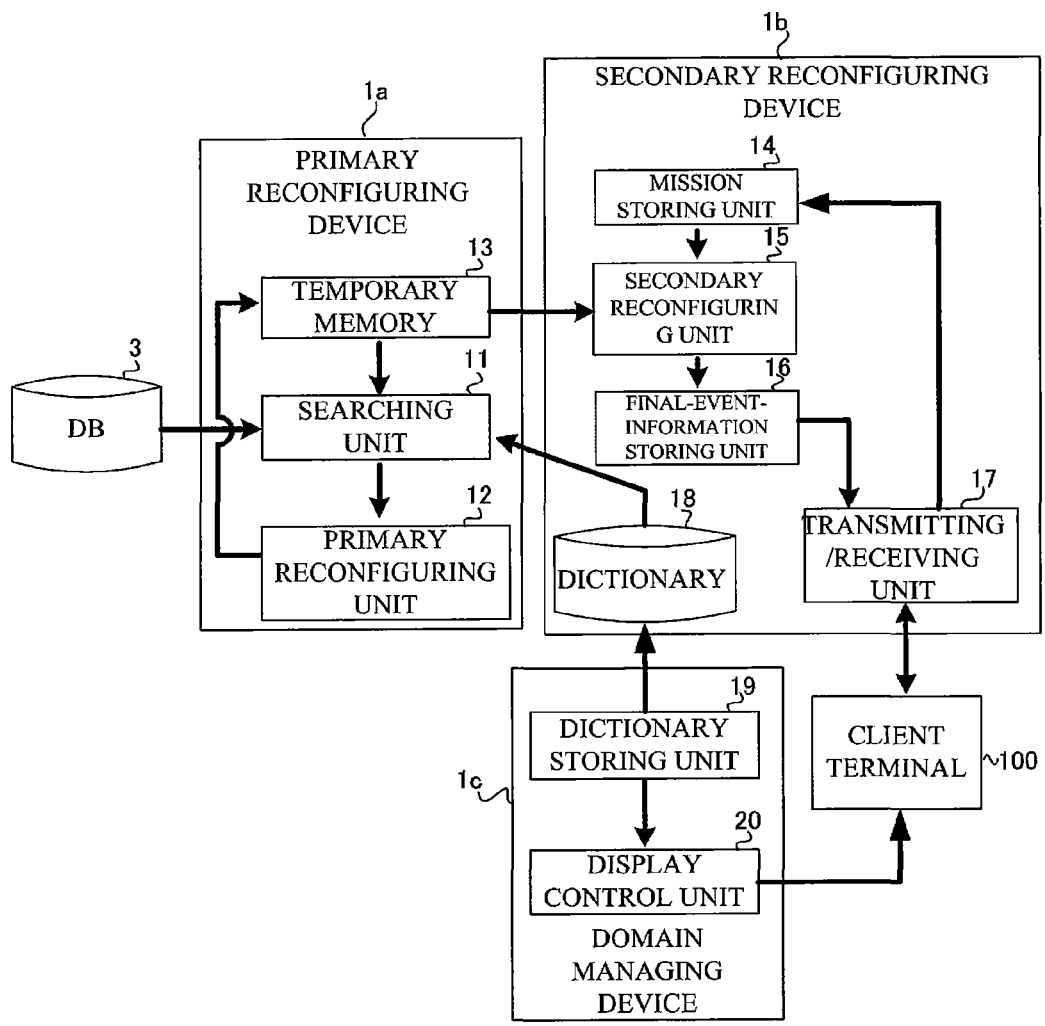
FIG. 7 is a block diagram showing a primary reconfiguring device, a secondary reconfiguring device, and a domain managing device.

FIG. 7 is a block diagram showing the primary reconfiguring device 1*a*, the secondary reconfiguring device 1*b*, and the domain managing device 1*c*. The primary reconfiguring device 1*a* includes a searching unit 11, a primary reconfiguring unit 12, and a temporary memory 13 all realized by an application stored in an external memory device. The secondary reconfiguring device 1*b* includes a mission storing unit 14, a secondary reconfiguring unit 15, a final-event-information storing unit 16, a transmitting/receiving unit 17, and a dictionary storing unit 18. Furthermore, the domain managing device 1*c* includes a dictionary storing unit 19 and a display control unit 20. The dictionary stored in the dictionary storing unit 18 of the secondary reconfiguring device 1*b* is referred by the primary reconfiguring device 1*a* via the network. The dictionary stored in the secondary reconfiguring device 1*b* is distributed over the network by the domain managing device 1*c*, and is consistent with the dictionary stored by the domain managing device 1*c*.

<Generation of Primary Event Information E1>

The searching unit 11 includes a CPU. The searching unit 11 refers to the dictionary stored in the dictionary storing unit 18 of the secondary reconfiguring device 1*b*, and searches the supporting information S from the database 3. The primary reconfiguring unit 12 also includes the CPU. The primary reconfiguring unit 12 adds the searched supporting information S to the primitive event information E0 and then to the primary event information E1, thereby successively reconfiguring the primary event information E1. The temporary memory 13 includes a RAM. The temporary memory 13 temporary stores the reconfigured primary event information E1.

FIG. 8 is an exemplary diagram showing a partial structure of the dictionary stored in the dictionary storing unit 18. The dictionary stores various models M for the primary event information E1. The models M define pieces of the supporting information S included in the primary event information E1. More specifically, the model M describes event kind information Ec indicating the kind of the job-site data G and supporting kind information Sc indicating the kind of the supporting information S in association with each other. The supporting kind information Sc indicates the supporting information S for a direct division available for the job-site level, the supporting information S for an indirect division indirectly derived from the job-site data G and available for various management levels that manage a business activity, and the supporting information S for a business determination available for a business-operation level.

Each model M also describes generated place information Gp indicating a place where the job-site data G is generated, and transmission-destination information Ad indicating the secondary reconfiguring device 1*b* where the primary event information E1 reconfigured based on that model M is transmitted.

The job-site data G output by the data generating device 200 is added with the event kind information Ec, the supporting information S indicating the date when the job-site data g was generated, and the supporting information S indicating the facility that generated the job-site data G. The searching unit 11 searches the model M describing the event kind information Ec added to the job-site data G from the dictionary, and also searches the supporting information S indicated by the supporting kind information Sc recited by the model M from the database 3.

Figure 9:
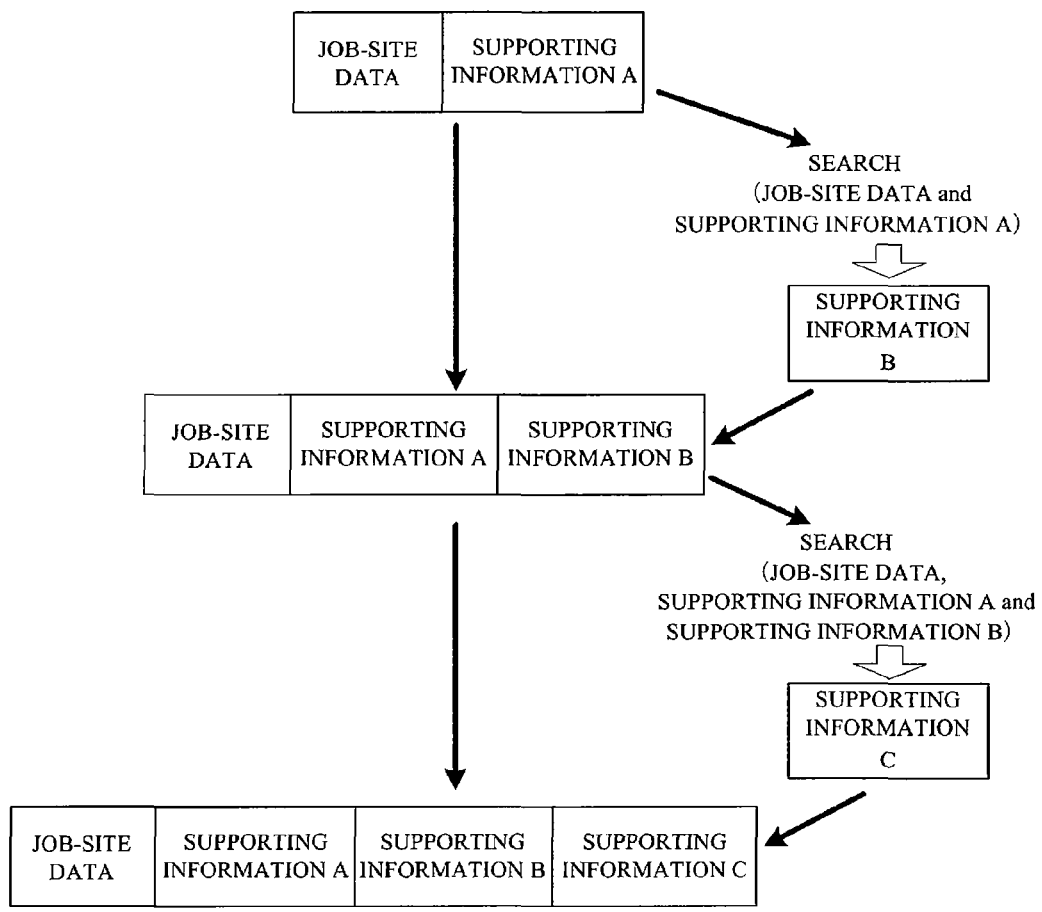
FIG. 9 is an explanatory diagram showing a reconfigured form of primary event information.

FIG. 9 is an explanatory diagram showing a reconfigured form of the primary event information E1. The searching unit 11 searches, in searching of the supporting information S, the other kinds of supporting information S using the contents of the job-site data G included in the primary event information E1, and the contents of the supporting information S already added as search keys. The searching unit 11 stores in advance the kinds of search keys used in accordance with the kind of the supporting information S to be searched, and a combination of such search keys as pieces of search query information. The searching unit 11 obtains such search keys from the job-site data G and the supporting information S included in the primary event information E1 to perform AND searching on the database 3. The search technique on the database 3 is not limited to the AND searching, and various techniques can be applied. For example, fuzzy searching may be applied. The fuzzy searching is sometimes referred to as semantic searching, and is to perform searching based on the meaning of a search key.

For example, the searching unit 11 reads the job-site data G and the content of the supporting information S of a kind A from the primitive event information E0 in searching of the supporting information S of a kind B indicated by the supporting kind information Sc included in a model obtained from the dictionary, performs AND searching on the database 3, and obtains the supporting information S with a content B1 relating to the kind B as a result. The primary reconfiguring unit 12 adds the newly obtained supporting information S to the primitive event information E0, thereby generating the primary event information E1.

Moreover, the searching unit 11 reads the job-site data G and the contents of the supporting information S of the kinds A and B from the newly generated primary event information E1 in searching of the supporting information S of a kind C indicated by the supporting kind information Sc included in the model M obtained from the dictionary, performs AND searching on the database 3, and obtains the supporting information S with a content C1 relating to the kind C as a result. The primary reconfiguring unit 12 adds the newly obtained supporting information S to the primary event information E1, thereby generating the new reconfigured primary event information E1.

When the database server 3 is opened to the public, the searching unit 11 may be a query-retrieve type client that requests a searching to a search engine accessible via the Internet.

Generation of Collection Condition Information

The mission storing unit 14 of the secondary reconfiguring device 1b includes a CPU, and a RAM or an HDD, etc., see FIG. 7. The mission storing unit 14 stores collection condition information input from the client terminal 100 via the network. The collection condition information is generated through a mutual communication between the client terminal 100 and the domain managing device 1c. The collection condition information includes the model M indicating the primary event information E1 to be collected and the supporting kind information Sc of the supporting information S to be included in the primary event information E1.

The display control unit 20 of the domain managing unit 1c provides a GUI operation screen that displays the contents of the dictionary to the client terminal 100. The GUI operation screen is, for example, a browser screen controlled by a script. The dictionary displayed by the GUI operation screen is stored in the dictionary storing unit 19 of the domain managing device 1c.

The user operates the GUI operation screen displaying the contents of the dictionary using a keyboard, a mouse, etc., over the client terminal 100, and thus one of or a plurality of the models M desired by the user to be collected, and one of or a plurality of the supporting kind information Sc to be included in those models M are selected.

The client terminal 100 transmits the selected model M and supporting kind information Sc as the collection condition information to the secondary reconfiguring device 1b. The transmission destination of the collection condition information is the secondary reconfiguring device 1b indicated by transmission-destination information Ad included in the selected model M.

<Generation of Message Information>

The secondary reconfiguring unit 15 of the secondary reconfiguring device 1b includes the CPU. The secondary reconfiguring unit 15 extracts the supporting information S and the job-site data G requested based on the collection condition information from the primary event information E1 input from the primary reconfiguring device 1a via the network, and generates the final event information E2.

The final-event-information storing unit 16 includes the HDD, etc. The final-event-information storing unit 16 stores the generated final event information E2. The transmitting/receiving unit 17 includes the CPU and a network adapter. The transmitting/receiving unit 17 provides the GUI operation screen for selection of the collection condition to the client terminal 100, receives the collection condition information, reads the final event information E2 requested by the client terminal 100 from the final-event-information storing unit 16, and transmits the read information to the client terminal 100.

Figure 10:
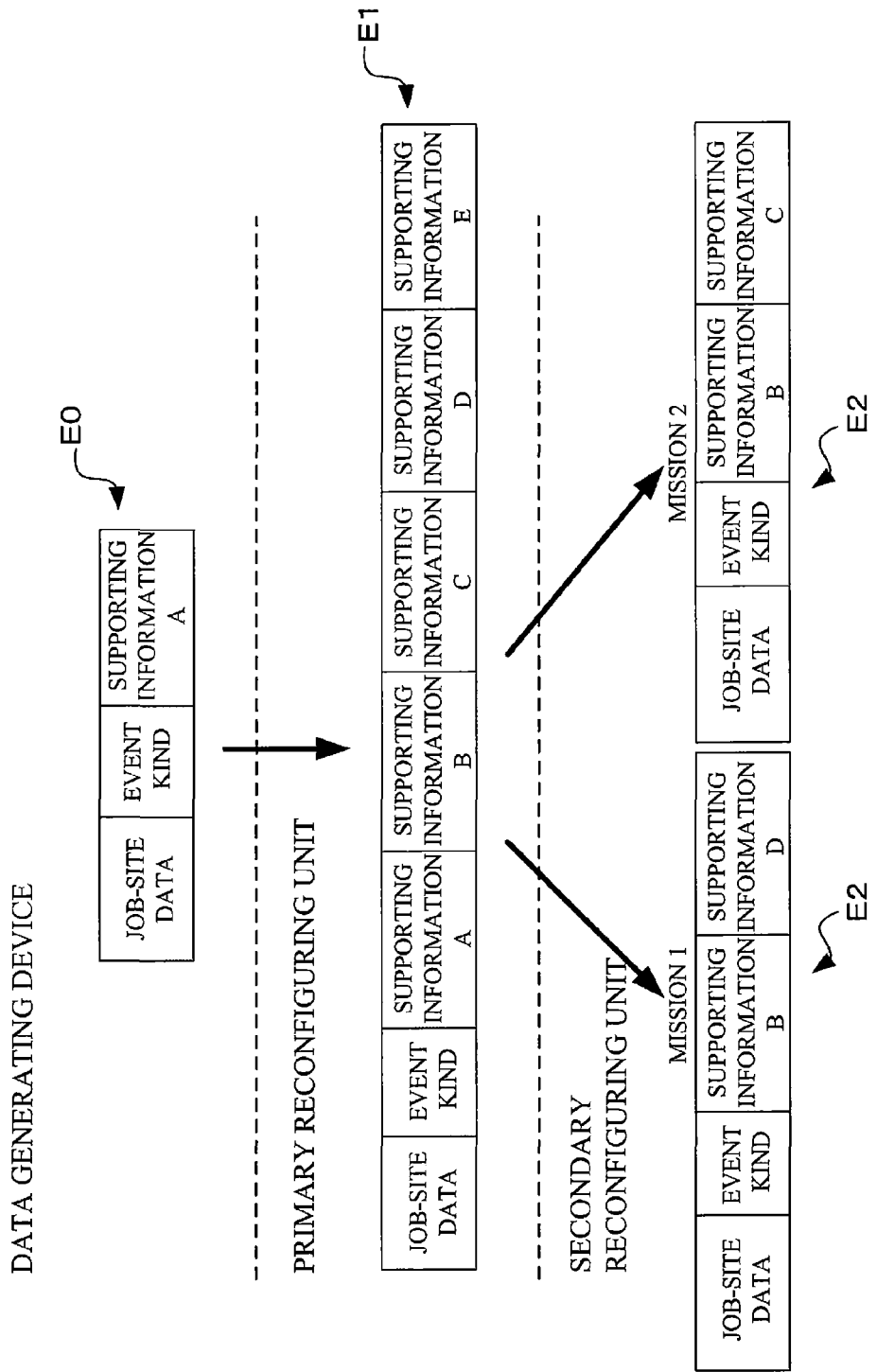
FIG. 10 is a data transition diagram showing a process of reconfiguring final event information.

FIG. 10 is a data transition diagram showing a process of reconfiguring the final event information E2. As shown in FIG. 10, it is presumed that in addition to the job-site data G and the event kind information, the primary event information E1 added with the pieces of supporting information S of the kinds A to E is generated. Moreover, it is presumed that the mission storing unit 14 stores the collection condition information indicating a request of the pieces of supporting information S of the kinds B and D in association with the client terminal 100a, and the collection condition information indicating a request of the pieces of supporting information S of the kinds B and C in association with the client terminal 100b.

At this time, the secondary reconfiguring unit 15 refers to the collection condition information associated with the client terminal 100a, and extracts, from the primary event information E1 including the pieces of supporting information S of the kinds A to D in addition to the job-site data G, the job-site data G, and the pieces of supporting information S of the kinds B and D, and generates the reconfigured final event information E2. Moreover, the secondary reconfiguring unit 15 refers to the collection condition information associated with the client terminal 100b, extracts the job-site data G and the pieces of supporting information S of the kinds B and C, and generates the final event information E2.

<Operation>

Figure 11:
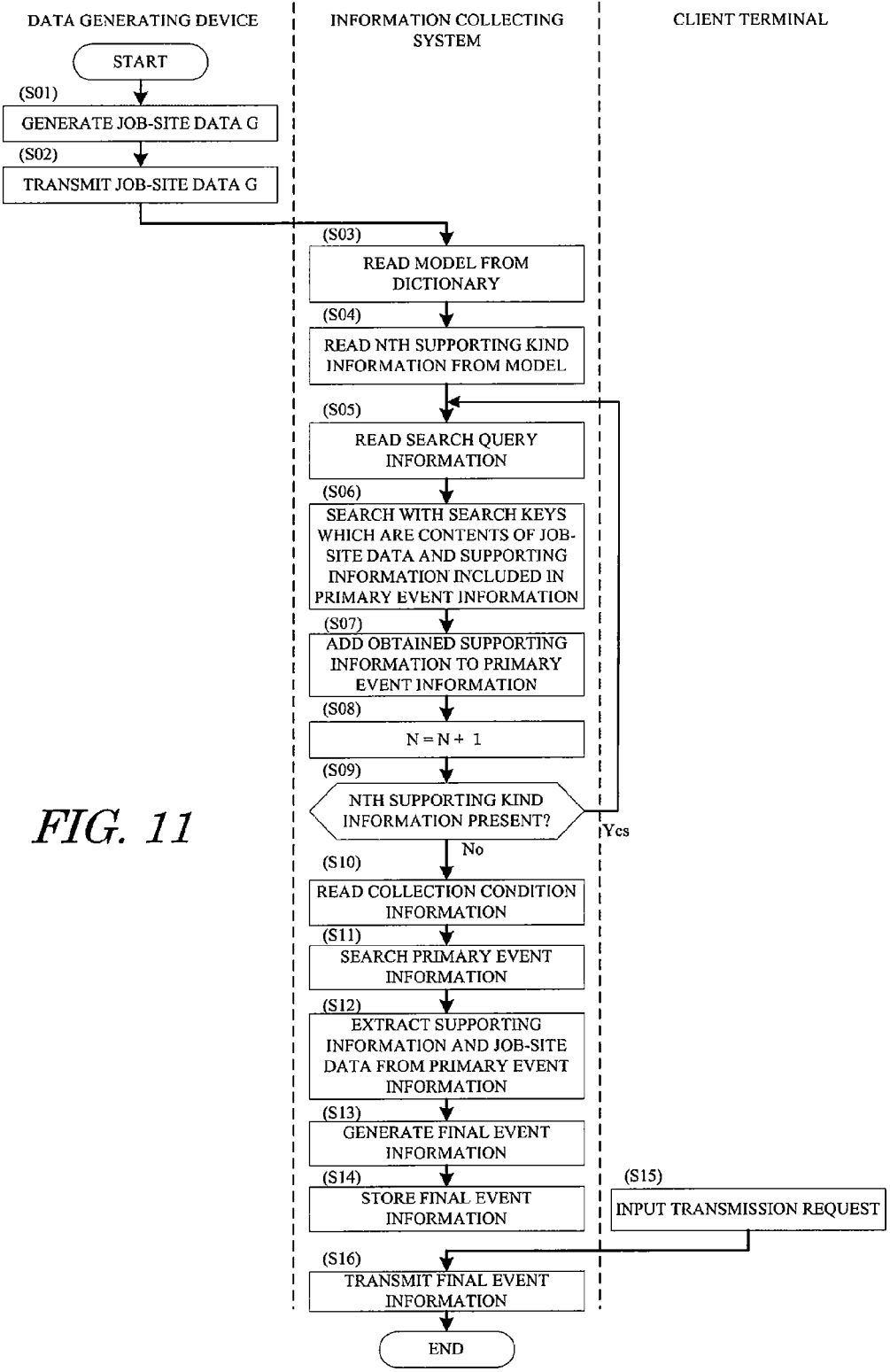
FIG. 11 is a flowchart showing operations from generation of job-site data G to reconfiguration of final event information.

Next, a detailed explanation will be given of the operation of such an information collecting system 1 with reference to FIG. 11. FIG. 11 is a flowchart showing operations from generation of the job-site data G to reconfiguration of the final event information E2.

First, when the data generating device 200 generates the job-site data G (step S01), the data generating device 200 transmits the job-site data G to the information collecting system 1 (step S02). In the information collecting system 1, the searching unit 11 reads the model M including the event kind information Ec added to the job-site data G from the dictionary stored in the dictionary storing unit 18 (step S03).

When reading the model M, the searching unit 11 reads the Nth supporting kind information Sc from the model M (step S04), reads a search key kind from search query information associated with the supporting kind information Sc (step S05), reads the contents of the job-site data G and each supporting information S corresponding to the search key kind, and searches in the database 3 with the contents of the read job-site data G and supporting information S being as search keys for AND searching (step S06). When the supporting information S is obtained upon searching, the primary reconfiguring unit 12 reconfigures the primary event information E1 by adding the obtained supporting information S to the event information (step S07).

The searching unit 11 sets a condition that N=N+1 (step S08), and when the model M includes the Nth supporting kind information Sc (step S09: YES), the process returns to the step S05 and the searching is repeated. Conversely, when the searching for all supporting kind information Sc is done (step S09: NO), the searching process completes.

When the searching process completes, the secondary reconfiguring unit 15 reads the collection condition information stored in the mission storing unit 14 (step S10), and searches the primary event information E1 indicated by the event kind information Ec included in the collection condition information from the temporary memory 13 (step S11). When this primary event information E1 is found, the secondary reconfiguring unit 15 extracts the supporting information S corresponding to the supporting kind information Sc included in the collection condition information and the job-site data G from the primary event information E1 (step S12), and puts extracted information together to generate the reconfigured final event information E2 (step S13). The final event information E2 is stored in the final-event-information storing unit 16 in association with the client-terminal identifying information included in the collection condition information (step S16).

Figure 12:
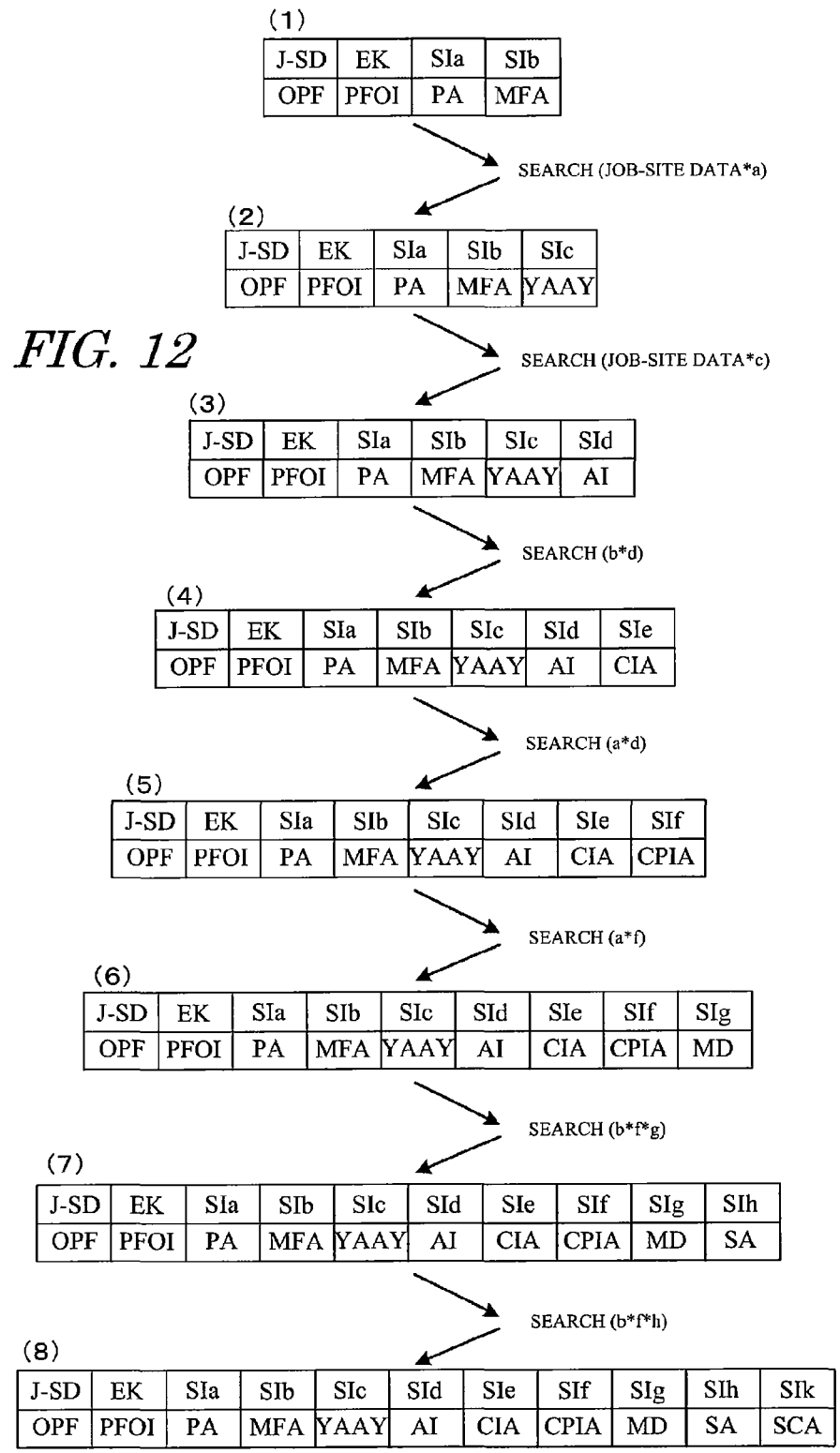
FIG. 12 shows a specific example of a reconfiguration process of primary event information.
Figure 13:
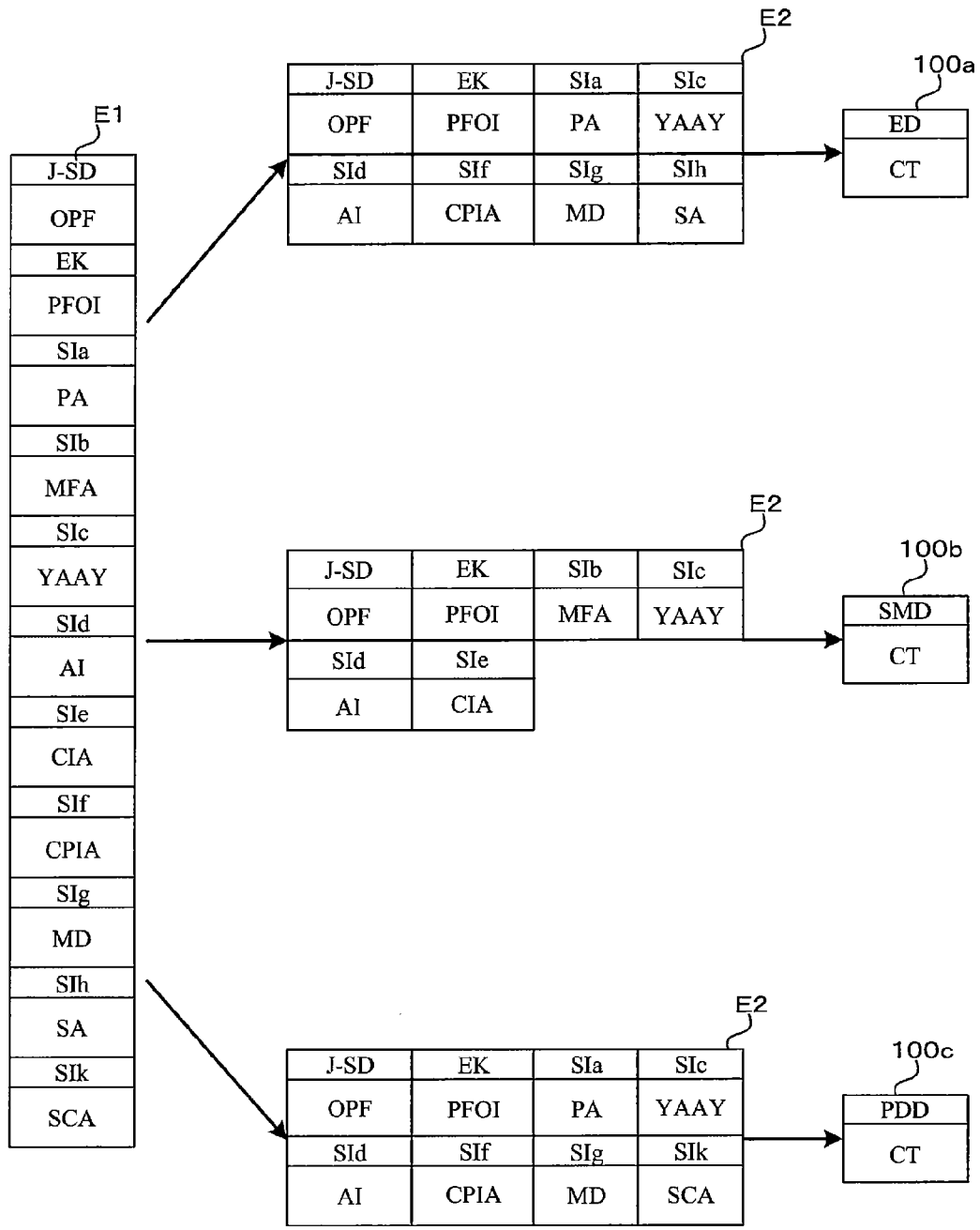
FIG. 13 shows a specific example of a transition process of event information.

Next, when a transmission request of the final event information E2 is input through the client terminal 100 (step S15), the transmitting/receiving unit 17 transmits, to the client terminal 100, the final event information E2 stored in association with the client terminal that has sent the request (step S16).
<Working>
The advantage of the information collecting system 1 will be explained with reference to FIGS. 12 and 13. FIG. 12 shows a specific example of a reconfiguration process of the primary event information E1. FIG. 13 shows a specific example of a transition process of the event information E.

In FIG. 12, the terms are abbreviated as follows: "J-SD" as the job-site data G; "EK" as the event kind; "SIa" as the supporting information A; "SIb" as the supporting information B; "OPF" as the occurrence of product failure; "PFOI" as the product failure occurring information; "PA" as the process A; "MFA" as the manufacturing factory A, "SIC" as the supporting information C; "YAAY" as the yield and allowable yield; "SId" as the supporting information D; "AI" as the abnormality information; "SIe" supporting information E; "CIA" customer information A; "SIf" supporting information F; "CPIA" as the consumable part information A; "SIg" as the supporting information G "MD" as the month and day; "SIh" as the supporting information H; "SA" as the storage A; "SIk" as the supporting information K; and "SCA" as the sales company A.

In FIG. 13, the terms are abbreviated as similar to FIG. 12, and in addition: "ED" as the engineering division; "CT" as the client terminal; "SMD" as the sales and marketing division client terminal; and "PD" as the purchasing division.

In the specific examples shown in FIGS. 12 and 13, the information collecting system 1 is connected to the network N laid in a manufacturing factory A for a product A including processes A to C. At least manufacturing factories A to C are present, and the customer of the product A manufactured in the manufacturing factory A is a customer A among customers A to C. The facility of the process A inspects a defective product at the final stage of the process A, and calculates a yield. Moreover, the facility of the process A uses a consumable part A among consumable parts A to C, and the consumable part A is stocked in a storage A among storages A to C. Furthermore, the consumable part A purchased by the manufacturing factory A is supplied from a sales company A among sales companies A to C.

<Primary Reconfiguration>
(1) Primitive Event Information E0

First, as shown in part (1) of FIG. 12, when the facility for the process A outputs the job-site data G indicating the occurrence of a product failure, the data generating device 200 that manages this facility for the process A adds event kind information Ec indicating the occurrence of a product failure, the supporting information S indicating that the process A is the place where the event occurred, and supporting information A indicating that the factory is the manufacturing factory A to the job-site data G, and generates the primitive event information E0. The data generating device 200 transmits the generated primitive event information E0 to the information collecting system 1 via the network N.

The searching unit 11 reads the model M identified by the event kind information indicating the occurrence of a product failure from the dictionary when the primitive event information E0 is input. The model M describes the supporting information S indicating the yield, the allowable yield, a check result for breakdown, and a customer needing a communication in the case of a breakdown, and the supporting kind information Sc indicating a consumable part used in the facility, a scheduled plan of replacement of the consumable part, a storage if the scheduled plan of replacement of the consumable part has elapsed, and the sales company of the consumable part.

(2) Searching of Yield and Allowable Yield

The searching unit 11 reads the model M identified by the event kind information Ec indicating the occurrence of a product failure. Next, the searching unit 11 reads the event kind information indicating the occurrence of a product failure, and the supporting information S for the process A from the primitive event information E0 in accordance with the search query information for searching the supporting information A indicating the yield and the allowable yield, and performs AND searching for those pieces of information.

The database 3 stores respective pieces of supporting information S on a yield A successively calculated upon the occurrence of a product failure, and the allowable yield in accordance with a combination of items for the occurrence of a product failure and respective processes A to C. The yield A is calculated based on the number of occurrences of the primitive event information E0 indicating the occurrence of a product failure, and the quantity of production, and is updated and stored in the database 3. The searching unit 11 obtains the pieces of supporting information S indicating the yield A of the process A and the allowable yield A thereof through a searching with a condition "yield A*process A". The primary reconfiguring unit 12 adds the pieces of supporting information S on the yield A and the allowable yield A obtained through this searching to the primitive event information E0 to generate the reconfigured primary event information E1.

(3) Searching of Information Indicating Breakdown or Normality

Next, the supporting kind information Sc indicating abnormality information is read from the model M. The abnormality information indicates the check result for breakdown. The searching unit 11 reads the job-site data G with the yield A, and the supporting information S indicating the allowable yield A added beforehand from the primary event information E1 in accordance with the search query corresponding to the supporting kind information Sc, and performs AND searching for those pieces of information.

The database 3 stores information indicating a breakdown or a normality in accordance with a combination of respective yields and respective allowable yields. The searching unit 11 obtains, for example, the supporting information S indicating a breakdown through a searching with a condition "yield A*allowable yield A". The primary reconfiguring unit 12 adds the supporting information S indicating the breakdown and obtained through the searching to the primary event information E1.

(4) Searching of Customer Information

Next, the supporting kind information Sc indicating a customer needing a communication in the case of the breakdown is read from the model M. Next, the searching unit 11 reads the supporting information S added beforehand and indicating the breakdown and the supporting information S indicating the manufacturing factory A from the primary event information E1 in accordance with the search query corresponding to the supporting kind information Sc, and performs AND searching for those pieces of information.

The database 3 stores pieces of information indicating the customers A to C in accordance with a combination of kinds of a breakdown and respective manufacturing factories A to C. The searching unit 11 obtains, for example, the supporting information S indicating the customer A for the product A manufactured at the manufacturing factory A through a searching with a condition "breakdown A*manufacturing factory A". The primary reconfiguring unit 12 adds the supporting information S indicating the customer A and obtained through this searching to the primary event information E1.

(5) Searching of Consumable Part

Next, the supporting kind information Sc indicating the consumable part used in the facility is read from the model M. The searching unit 11 reads the supporting information S added beforehand and indicating the breakdown and the supporting information S indicating the process A from the primary event information E1 in accordance with the search query corresponding to the supporting kind information Sc, and performs AND searching for those pieces of information.

The database 3 stores the pieces of information indicating the consumable parts A to C in accordance with a combination of kinds of a breakdown and respective processes A to C. The searching unit 11 obtains, for example, the supporting information S indicating the consumable part A used in the process A through a searching with a condition "breakdown A*process A". The primary reconfiguring unit 12 adds the supporting information S indicating the consumable part A obtained through this searching to the primary event information E1.

(6) Searching of Scheduled Replacement Plan

Next, the supporting kind information indicating the scheduled plan of replacement of the consumable part is read from the model M. The searching unit 11 reads the supporting information S added beforehand and indicating the consumable part A and the supporting information S indicating the process A from the primary event information E1 in accordance with the search query corresponding to the supporting kind information, and performs AND searching for those pieces of information.

The database 3 stores information indicating the scheduled plan of replacement of the consumable part in accordance with a combination of respective consumable parts A to C and respective processes A to C. The searching unit 11 obtains, for example, the supporting information S indicating a month, a day, and a year which are the scheduled plan of replacement of the consumable part A used in the process A through a searching with a condition "consumable part A*process A". The primary reconfiguring unit 12 adds the supporting information S obtained through this searching and indicating a month, a day, and a year to the primary event information E1.

(7) Searching of Storage

Next, the supporting kind information Sc indicating the storage of the consumable part is read from the model M. The searching unit 11 reads the supporting information S indicating the consumable part A, the supporting information S indicating the manufacturing factory A, and the supporting information S added beforehand and indicating a month, a day, and a year from the primary event information E1 in accordance with the search query corresponding to the supporting kind information Sc, and performs AND searching for those pieces of information.

The database 3 stores information indicating a storage in accordance with a combination of respective scheduled plans of replacement, respective consumable parts A to C and respective manufacturing factories A to C. The searching unit 11 obtains, for example, the supporting information S indicating the storage A located in the manufacturing factory A for the consumable part A through a searching with a condition "month, day and year*consumable part A*manufacturing factory A". The primary reconfiguring unit 12 adds the supporting information S indicating the storage A and obtained through this searching to the primary event information E1.

(8) Searching of Sales Company

Next, the supporting kind information Sc indicating the sales company of the consumable part is read from the model M. The searching unit 11 reads the supporting information S indicating the consumable part A, the supporting information S indicating the manufacturing factory A, and the supporting information S indicating the storage A from the primary event information E1 in accordance with the search query corresponding to the supporting kind information Sc, and performs AND searching for those pieces of information.

The database 3 stores pieces of information indicating the sales companies A to C of the consumable parts in accordance with a combination of respective consumable parts A to C and respective storages A to C. The searching unit 11 obtains, for example, the supporting information S indicating the sales company A of the consumable part A purchased by the manufacturing factory A through a searching with a condition "consumable part A*manufacturing factory A*storage A". The primary reconfiguring unit 12 adds the supporting information S indicating the sales company A and obtained through this searching to the primary event information E1.

<Secondary Reconfiguration>

Figure 14:
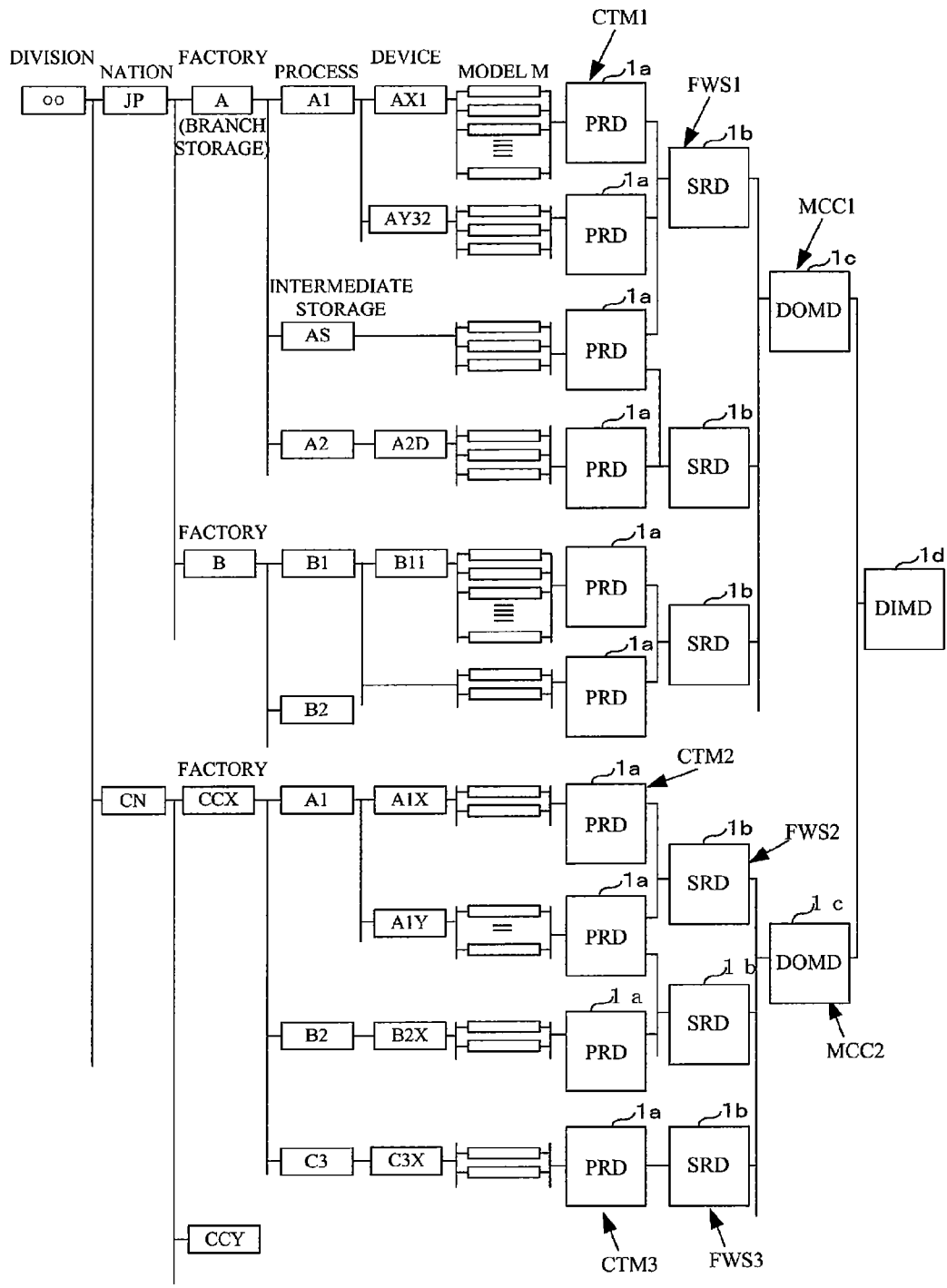
FIG. 14 is a block diagram showing a configuration of a whole network.

FIG. 14 shows a specific example of the transition process of the event information E. In FIG. 14, the terms are abbreviated as follows: "PRD" as the primary reconfiguring device; "SRD" as the secondary reconfiguring device; "DOMD" as the domain managing device.

The client terminal 100a accessing the information collecting system 1 is a terminal for a person responsible for maintenance in the manufacturing factory A, the client terminal 100b is a terminal for a person responsible for sales and marketing, and the client terminal 100c is a terminal for a person responsible for purchasing.

The person responsible for maintenance causes, through the GUI operation screen using the client terminal 100a, the information collecting system 1 to transmit first collection condition information requesting the job-site data G with a yield, and the pieces of supporting information S on a process, an allowable yield, presence/absence of a breakdown, a consumable part, a scheduled plan of replacement of the consumable part, and a storage.

Moreover, the person responsible for sales and marketing causes, through the GUI operation screen using the client terminal 100b, the information collecting system 1 to transmit second collection condition information requesting the job-site data G with the yield, and the pieces of supporting information S on a manufacturing factory, an allowable yield, presence/absence of a breakdown, and a customer.

Furthermore, the person responsible for purchasing causes, through the GUI operation screen using the client terminal 100c, the information collecting system 1 to transmit third collection condition information requesting the job-site data G with the yield, and the pieces of supporting information S on a process, an allowable yield, presence/absence of a breakdown, a consumable part, a scheduled plan of replacement of the consumable part, and a sales company.

At this time, the secondary reconfiguring unit 15 refers to the first collection condition information from the primary event information E1 reconfigured in FIG. 12, extracts job-site data A with a yield A, and the pieces of supporting information S on the process A, an allowable yield A, presence/absence of a breakdown, the consumable part A, a month, a day, and a year which are the scheduled plan of replacement, and the storage A, puts those pieces of information together as the final event information E2, and stores the final event information E2 in the final-event-information storing unit 16 in association with the client terminal 100a. When receiving a transmission request from the client terminal 100a, the transmitting/receiving unit 17 reads the final event information E2 associated with the client terminal 100a from the final-event-information storing unit 16, and transmits the read information to the client terminal 100a.

The secondary reconfiguring unit 15 extracts, with reference to the second collection condition information, the job-site data A with the yield A, and the pieces of supporting information on the manufacturing factory A, the allowable yield A, a breakdown, and the customer A, puts those information together as the final event information E2, and stores the final event information E2 in the final-event-information storing unit 16 in association with the client terminal 100b. When receiving a transmission request from the client terminal 100b, the transmitting/receiving unit 17 reads the final event information E2 associated with the client terminal 100b from the final-event-information storing unit 16, and transmits the read information to the client terminal 100b.

The secondary reconfiguring unit 15 extracts, with reference to the third collection condition information, the job-site data A with the yield A, and the pieces of supporting information S on the process A, the allowable yield A, a breakdown, the consumable part A, a month, a day and a year which are the scheduled plan of replacement of the consumable part A, and the sales company A of the consumable part A, puts those information together as the final event information E2, and stores the final event information E2 in the final-event-information storing unit 16 in association with the client terminal 100c. When receiving a transmission request from the client terminal 100c, the transmitting/receiving unit 17 reads the final event information E2 associated with the client terminal 100c from the final-event-information storing unit 16, and transmits the read information to the client terminal 100c.

<3. How to Operate Information Collecting System>
<Configuration>

Figure 15:
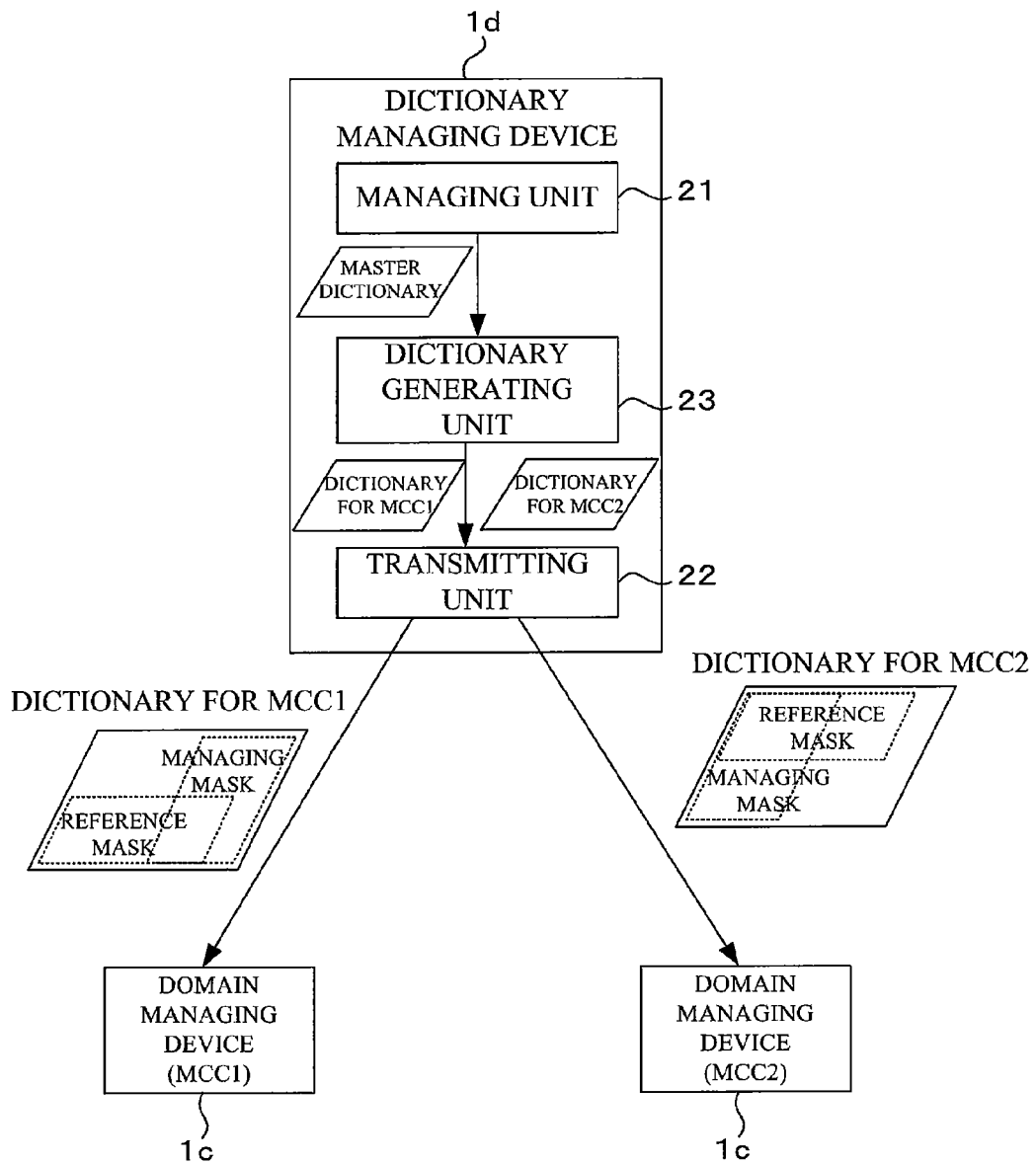
FIG. 15 is a block diagram showing a configuration of a dictionary managing device connected to a network.

FIGS. 14 and 15 show a configuration of a whole network of an organization having the above-explained information collecting system 1. FIG. 14 is a block diagram showing a configuration of a whole network, and FIG. 15 is a block diagram showing a configuration of a dictionary managing device 1d connected to this network.

As shown in FIG. 14, the whole network of an organization is managed by a dictionary managing device 1d. The dictionary managing device 1d has a plurality of domain managing devices 1c as slaves. Respective domain managing devices 1c manage corresponding domains D1 to Dn. That is, a domain D is managed by a domain managing device 1c. A plurality of secondary reconfiguring devices 1b belong to the domains D1 to Dn. A secondary reconfiguring device 1b belongs to any one of the domains D1 to Dn.

Furthermore, a plurality of primary reconfiguring devices 1a belong to the domains D1 to Dn. The primary reconfiguring devices 1a are each connected to the independent lower network N3. In other words, only a primary reconfiguring device 1a is connected to a lower network N3. The lower network N3 is configured by the plurality of data generating devices 200a, and 200b, etc. Moreover, each of the client terminals 100a, and 100b, etc, belongs to any one of the domain managing devices 1c, and generates the collection condition information using the dictionary stored in the master domain managing device 1c only.

In such a whole network, the dictionary managing device 1d shown in FIG. 15 includes a managing unit 21 that manages a master dictionary. The master dictionary describes the models M of the primary event information E1 relating to all job-site data G generated throughout the whole network. The managing unit 21 corrects and edits the model M described in the master dictionary.

The dictionary managing device 1d includes a transmitting unit 22 that distributes an individual dictionary to the domain managing devices 1c. When the individual dictionary is distributed, the dictionary managing device 1d generates the individual dictionary from the master dictionary for each domain managing device 1c. That is, the dictionary managing device 1d includes a dictionary generating unit 23. When the individual dictionary is generated, the dictionary generating unit 23 generates a dictionary having the master dictionary covered by a managing mask and a reference mask.

The dictionary generating unit 23 covers an unrewritable model M with the managing mask. The operation of covering the managing mask means clarifying an unrewritable model M on data, such as setting up a flag to an unrewritable model P1, and listing up unrewritable models M. The dictionary generating unit 23 puts the managing mask on the model M other than the models M belonging to the domain D managed by the domain managing device 1c having the transmitting unit distributing the dictionary. Moreover, the dictionary generating unit 23 puts the reference mask on the model M which is set to be unreadable when the collection condition information is generated.

The domain managing device 1c stores the dictionary individually distributed by the dictionary managing device 1d in the dictionary storing unit 19. Moreover, the dictionary stored in the dictionary storing unit 19 is distributed to the secondary reconfiguring device 1b in the same domain.

The dictionary has the model M of the primary event information E1 relating to all job-site data G generated in the domain D correctable or editable using the managing mask. This dictionary has the model M within a certain range viewable using the reference mask when the collection condition information is generated.

That is, a dictionary correcting editor of the domain managing device 1c reads the managing mask, responds to correction or edition of the model M other than the model M covered by the managing mask, and reflects the correction or edition in the dictionary. Conversely, the dictionary correcting editor does not display the model M covered by the managing mask or does not respond to such correction or edition to such a model M.

Moreover, when receiving a transmission request of the model M to generate the collection condition information from the client terminals 100a, and 100b, etc, the domain managing device 1c reads the model M other than the model M covered by the reference mask from the dictionary, and sends back the read model M to the client terminals 100a, and 100b, etc. The sent model M other than the model M covered by the reference mask is displayed through the GUI operation screens of the client terminals 100a, and 100b, etc.

<Effect>

More specifically, as shown in FIG. 14, a device CTM1 that is a primary reconfiguring device 1a is connected to a device AX1 that is a data generating device 200 in a process A1 at a factory A in Japan via the lower network. Hence, the device CTM1 receives the job-site data G output by the device AX1.

The place where the dictionary referred by the device CTM1 is stored is set in advance to be a device FWS1 that is a secondary reconfiguring device 1b, and the device CTM1 refers to the dictionary stored in the dictionary storing unit 18 of the device FWS1, and reconfigures the primary event information E1 from the job-site data G derived from the device AX1.

The destination where the reconfigured primary event information E1 is output is associated with the model M of this primary event information E1, and transmission-destination information Ad of such a destination is set to be the device FWS1. Hence, the device CTM1 transmits the generated primary event information E1 to the device FWS1.

Moreover, a device CTM2 that is a primary reconfiguring device 1*a* is connected to a device A1X that is a data generating device 200 in a process A1 at a factory CCX in China via the lower network. Hence, the device CTM2 receives the job-site data G output by the device A1X.

The place where the dictionary referred by the device CTM2 is stored is set in advance to be a device FWS2 that is a secondary reconfiguring device 1*b*, and the device CTM2 refers to the dictionary stored in the dictionary storing unit 18 of the device FWS2, and reconfigures the primary event information E1 from the job-site data G derived from the device A1X in China.

The destination where the reconfigured primary event information E1 is output is associated with the model M of this primary event information E1, and transmission-destination information Ad of such a destination is set to be the device FWS2. Hence, the device CTM2 transmits the generated primary event information E1 to the device FWS2.

Furthermore, a device CTM3 that is a primary reconfiguring device 1*a* is connected to a device C3X that is a data generating device 200 in a process C3 at a factory CCX in China via the lower network. Hence, the job-site data G output by the device C3X is received by the device CTM3.

The place where the dictionary referred by the device CTM3 is stored is set in advance to be a device FWS3 that is a secondary reconfiguring device 1*b*, and the device CTM3 refers to the dictionary stored in the dictionary storing unit 18 of the device FWS3, and reconfigures the primary event information E1 from the job-site data G derived from the device C3X.

The destination where the reconfigured primary event information E1 is output is associated with the model M of this primary event information E1, and transmission-destination information Ad of such a destination is set to be the device FWS3. Hence, the device CTM3 transmits the generated primary event information E1 to the device FWS3.

A client terminal 100*a* has a place where this client terminal 100*a* accesses to generate the collection condition information and which is set in advance to be the device FWS1. That is, the kind of the model M displayed by the GUI operation screen on the client terminal 100*a* depends on the dictionary stored in the device FWS1.

Figure 16:
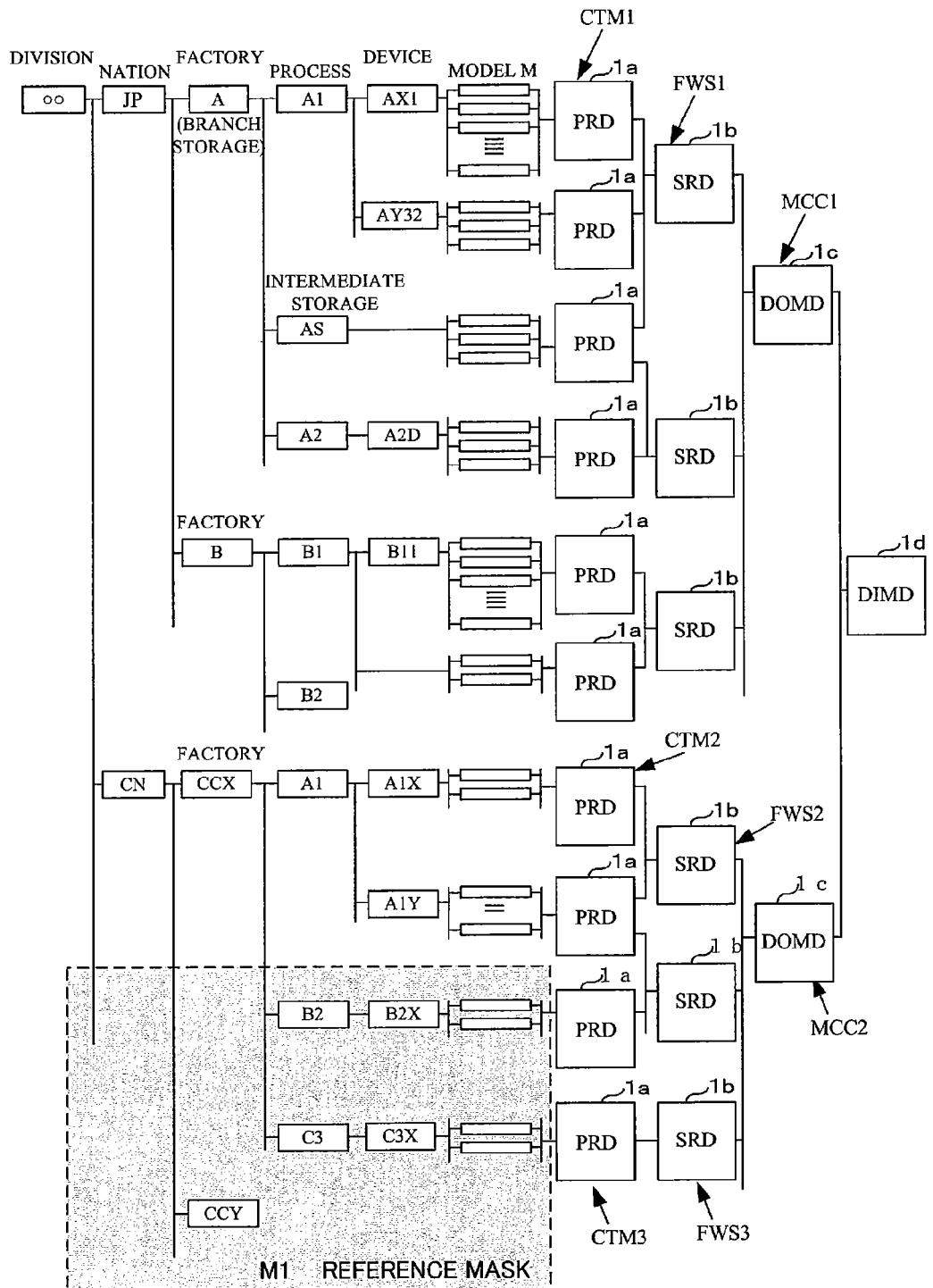
FIG. 16 is an exemplary diagram showing a dictionary having a part thereof hidden by a reference mask.

FIG. 16 shows a dictionary stored in the device FWS1, and is an exemplary diagram showing such a dictionary having apart thereof hidden by the reference mask. It should be noted that the reference mask can be freely set beyond the ranges of the domains D1 to Dn. That is, as shown in FIG. 15, according to the dictionary stored in both device MCC1 and device FWS1, the model M for generating the primary event information E1 derived from the job-site data G generated by the device C3X in China is hidden by a reference mask M1.

In other words, the dictionary managing device 1*d* generates, from the master dictionary, the dictionary having the model M for generating the primary event information E1 derived from the job-site data G generated by the device C3X in China and hidden by the reference mask M1, and distributes the generated dictionary to a device MCC1 that is a domain managing device 1*c*.

Hence, the GUI operation screen of the client terminal 100*a* set to access the device MCC1 displays, in a viewable manner, respective models M other than the model M derived from the device C3X in China.

Accordingly, the GUI screen of the client terminal 100*a* displays respective models M of the primary event information E1 derived from the device AX1 in Japan and China.

The user can select one or a plurality of models M of the primary event information E1 derived from the device AX1 in Japan and China by operating the input device, such as a keyboard or a mouse, and select one or a plurality of supporting kind information Sc of the selected model M.

In accordance with such a selection, the client terminal 100*a* generates collection condition information for the final event information E2 based on the job-site data G derived from the device AX1 in Japan and China, and transmits the collection condition information to the devices FWS1 and FWS2 which are the secondary reconfiguring devices 1*b* indicated by the transmission-destination information Ad associated with the selected model M.

Conversely, the model M hidden by the reference mask is not displayed on the GUI operation screen, and thus the model M derived from the device C3X cannot be selected through the client terminal 100*a* to generate the collection condition information. Hence, the client terminal 100*a* generating the collection condition information with reference to the device MCC1 is unable to request collection of the final event information E2 derived from the device C3X, and to browse this final event information E2.

Figure 17:
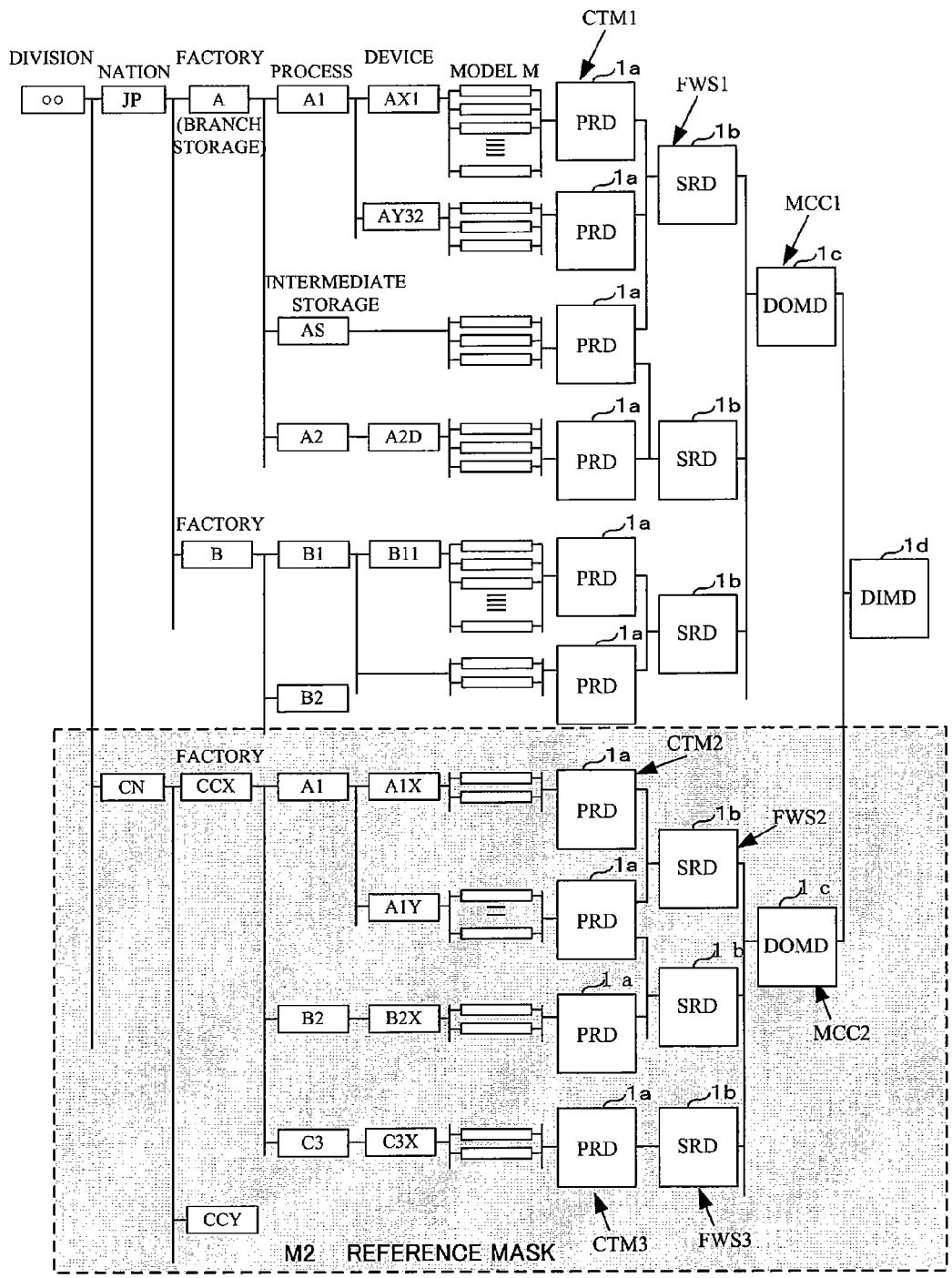
FIG. 17 is an exemplary diagram showing a dictionary having a part thereof hidden by a reference mask.

FIG. 17 shows a dictionary stored in the device FWS1 and is an exemplary diagram showing such a dictionary having a part thereof hidden by the managing mask. It should be noted that the managing mask can be set only within the certain domains D1 to Dn. That is, as shown in FIG. 17, according to the dictionary stored in the device MCC1, the model M belonging to the domain D of a device MCC2 that is the other domain managing device 1*c* is hidden by a managing mask M2.

In other words, the dictionary managing device 1*d* generates, from the master dictionary, a dictionary having the model M belonging to the domain D of the device MCC2 hidden by the managing mask M2, and distributes such a dictionary to the device MCC1.

Accordingly, even if the model M belonging to the domain D of the device MCC2 is corrected or a new model M based on the job-site data G of the data generating device 200 belonging to China is added through the input device, the dictionary correcting editor of the device MCC1 does not reflect the result of such a correction or an addition to the dictionary. Conversely, when the model M belonging to the domain D of the device MCC1 is corrected or a new model M based on the job-site data G of the data generating device 200 in Japan is added through the input device, the dictionary correcting editor reflects such a correction or an addition to the dictionary.

<Advantage>

As explained above, the information collecting system 1 of this embodiment includes the dictionary storing unit 18 that stores a dictionary defining the kinds of each supporting information S to be added to the job-site data G, and the database 3 storing the pieces of supporting information S of various kinds and various contents.

The searching unit 11 searches each supporting information S from the database 3 in accordance with the dictionary. At this time, the searching unit 11 searches the other kind of supporting information S with a search key that is a combination of the job-site data G included in the primary event information E1 reconfigured by the primary reconfiguring unit 12 and each supporting information S newly added. The primary reconfiguring unit 12 adds each supporting information S successively searched by the searching unit 11 to the job-site data G, thereby successively reconfiguring the primary event information E1.

The transmitting/receiving unit 17 receives various kinds of supporting information S from the client terminal 100, and the secondary reconfiguring unit 15 extracts the job-site data G and the supporting information S described in the collection condition information from the primary event information E1, and the final event information E2 is reconfigured. The final event information E2 is stored in the final-event-information storing unit 16 in association with the client terminal 100. When the client terminal 100 requests the final event information E2, the transmitting/receiving unit 17 transmits the final event information E2 stored in the final-event-information storing unit 16 to the client terminal 100.

Accordingly, it seems as if event information directly describing necessary contents in an understandable manner are generated as viewed from a side where the client terminal 100 is operated, necessary information can be obtained without any excess and deficiency, and the secondary and tertiary meanings of the event information are understandable at a time point when the event information just arrives without an interpretation of work. Hence, a time lag in arrival of the event information can be eliminated throughout the hierarchy from the job-site level to the management and business operation level, and a time lag in understanding of the event information is also eliminated.

Moreover, by adjusting the collection condition information at the side of the client terminal 100, useful information for the other divisions can be obtained, and respective divisions can share the common information in a traverse manner. Therefore, it becomes possible for all divisions to cope with various problems instantaneously and flexibly.

As explained above, the information collecting system provided by the present invention stimulates the business activity through the sharing of information while focusing on the sharing of information in a real-time manner throughout all levels in a hierarchy. Conversely, if information is viewable to all people without any restriction, it may be disadvantageous to the organization in some cases. Hence, it is necessary to take measures for information security. For example, information may be encoded, information itself may be added with a function of requesting an authority when being browsed, or a storage storing information may be set to request an access authority.

However, in order to maintain the purpose of information sharing that is the subject of the information collecting system provided by the invention, information sharing and information security must be balanced sophisticatedly. If not, according to the above-explained information security schemes, a person collecting information may perceive the restriction of the information, which ruins the concept of information sharing. Accordingly, a new information security scheme is required which does not cause a person collecting information to feel the restriction of the information.

Hence, according to this embodiment, regarding a dictionary, some models M are added with a reference mask M1 for each domain managing device 1c, an individual dictionary is generated for each domain managing device 1c, and a dictionary added with the reference mask M1 is distributed. The client terminals 100a, 100b, and 100c, etc, access the dictionary of the domain managing device 1c set in advance, and generate the collection condition information from the model M that is not hidden by the reference mask M1.

That is, the pieces of event information E1 and E2 circulating the network N are not encoded and an access authority is not set to the storage storing those pieces of information, but a dictionary that will be a recipe to generate the final event information E2 is masked, thereby restricting generation and collection of the final event information E2. Such a restriction is invisible from a user side, and the user does not feel such a restriction. Hence, it is unnecessary to encode each final event information E2 and to set a restriction for reading of such information, but bare information can be distributed as it is over the network, and the user does not perceive that the information is restricted. Accordingly, the concept of information sharing can be maintained.

Moreover, in generation of the individual dictionary, some models M are further added with the managing mask M2 for each domain managing device 1c, and the domain managing device 1c accepts operations given from input means which are correction of only the model M that is not added with the managing mask M2 to correct the model M.

As explained above, by simply adding the reference mask M1 and the managing mask M2, a complicated network is established which separately restricts browsing and correction of the model M. Even if the operation of such a network is complicated, browsing and correction of the model M can be easily and strictly restricted.

Below is the summary of the above-explained embodiment. According to the information collecting system 1 of the above-explained embodiment, a person who wants event information can utilize the event information whenever such information is desired. A person who is capable of manipulating a personal computer can utilize data in accordance with the purpose as needed to improve the job site or to start a new operation, etc. Moreover, establishment of an information infrastructure for sharing job-site data with an immediacy enables effective execution of atypical works including decision making necessary in a manufacturing activity which changes case by case and which cannot be handled by the conventional systems, such as improvement of the job site and starting of a new operation, thereby improving the manufacturing capability and enabling speedy response to an always-changing external environment.

Since the whole names of various job-site data are registered in a dictionary as the pieces of primary event information E1 including the attribute thereof, desired data is freely selectable from a catalog. A result of collecting and accumulating information under a certain collection condition set in advance can be obtained, and such a result can be utilized dynamically for improvement of the job site and the operation of the job site.

Moreover, after desired secondary event information E2 is obtained, such information can be processed and edited in the forms of a table and a graph using a general-purpose software installed in a personal computer, and thus a person responsible for the work at the job site can directly utilize such information at the job site.

The explanation was mainly given of the job site of manufacturing throughout the above-explained embodiment, but the present invention is not limited to such kind of the job site, and can be applied to other general job sites. Such an application is also included within the scope and spirit of the present invention. Example general job sites are commodity distribution, storage management, sales and marketing management, construction, designing, other services, an agriculture organization, and a job site with a high urgency. In the case of an agriculture organization, the present invention can be applied to, for example, share technical know-how in a corporate agriculture organization. Moreover, in the case of a job site with a high urgency, for example, if the present invention is applied thereto, information on a person needing a rescue is transmitted from the job site, is shared by an organization in a traverse manner, and a helicopter, an equipment, or a hospital are requested in accordance with such information.

Furthermore, according to the above-explained embodiment, the secondary reconfiguring device 1b stores the dictionary and refers this dictionary to generate the primary event information E1 and the final event information E2, but the place where the dictionary is stored is not limited to the secondary reconfiguring device 1b. The primary reconfiguring device 1a may store such a dictionary, and a computer which is not the primary reconfiguring device 1a and the secondary reconfiguring device 1b and which is sharable may store the dictionary.

What is claimed is:

1. An information collecting system that is connected to, via a network, a data generating device which adds attribute data to generated job-site data and which transmits the job-site data with the attribute data to the network, the information collecting system being configured to generate event information formed by adding supporting information to the job-site data, and the information collecting system comprising:
    a dictionary storing unit that stores a dictionary which defines a kind of each supporting information to be added to the job-site data;
    a database that stores pieces of supporting information of various kinds and various contents;
    a searching unit that searches each supporting information appropriate for a content of the job-site data from the database in accordance with the dictionary; and
    a primary reconfiguring unit that adds the searched supporting information to the job-site data in addition to the attribute data to reconfigure the event information,
    wherein:
    the dictionary records for each kind of the job-site data, a model of the event information;
    the model is constructed so as to recite information indicating a kind of the supporting information to be added to the event information;
    the searching unit:
        reads, from the model corresponding to a kind of the job-site data, information indicating the kind of the supporting information;
        generates a search key corresponding to the kind indicated by referred information by combining the job-site data contained in the event information reconfigured by the primary reconfiguring unit with each already added supporting information; and
        searches the supporting information from the database based on the search key; and
    the supporting information is background information that includes at least one of pieces of information respectively indicating an editing assist material which is necessary for editing the job-site data, a comparison target data to be compared with the job-site data, an analysis assist material which affects an analysis and an evaluation assist material which affects an evaluation on an analysis result.

2. The information collecting system according to claim 1, wherein
    the job-site data is a characteristic in a fishbone diagram,
    the background information is a factor in the fishbone diagram which includes the job-site data as the characteristic.

3. The information collecting system according to claim 1, wherein
    the job-site data is included as one of factors in a fishbone diagram having a knowledge as a characteristic, and
    the background information is other factors in the fishbone diagram including the job-site data as a factor.

4. The information collecting system according to claim 1, wherein
    the dictionary storing unit stores, in addition to supporting information for a direct division and available to a job-site level where the data generating device is placed, supporting information for an indirect division indirectly derived from the job-site data and available to various management levels that manage a business activity, and supporting information for a business determination available to a business operation level, and
    the event information is reconfigured by being added with the supporting information for the indirect division and the supporting information for a business determination in addition to the supporting information for the direct division by the searching unit and the primary reconfiguring unit.

5. The information collecting system according to claim 1, further comprising:
    a client terminal which is connected to the information collecting system via the network and which requests collection of the event information;
    a receiving unit that receives each kind of the supporting information from the client terminal;
    a secondary reconfiguring unit that extracts the job-site data and each kind of the supporting information received by the receiving unit from the event information reconfigured by the primary reconfiguring unit to reconfigure new event information;
    an event information storing unit that stores the event information reconfigured by the secondary reconfiguring unit in association with the client terminal; and
    a transmitting unit that transmits the event information stored in the event information storing unit.

6. The information collecting system according to claim 5, further comprising a display control unit that causes the client terminal to display a list of various supporting information defined in the dictionary, and to display a screen to transmit the various supporting information selected through the list.

7. The information collecting system according to claim 1, wherein the database is a server opened to a public over the Internet.

8. An information collecting system which includes a dictionary managing device, a plurality of secondary managing devices, a plurality of secondary reconfiguring devices, and a plurality of primary reconfiguring devices, and which is connected to, via a network, a plurality of data generating devices that generate job-site data and a plurality of client terminals that request collection of event information, the dictionary managing device comprising:
    a managing unit that stores a dictionary recording all models of all event information derived from the job-site data output by all data generating devices;
    a dictionary generating unit that adds, for each domain managing device, a reference mask to some models in the dictionary stored in the managing unit in order to generate an individual dictionary for each domain managing device; and
    a transmitting unit that distributes the corresponding dictionary added with the reference mask to the domain managing device, the domain managing device comprising:
        a display control unit that causes the predetermined client terminal to display the model which is included in the distributed dictionary and which is not hidden by the reference mask; and causing the client terminal to generate collection condition information for the event information based on the displayed model, the primary reconfiguring unit comprising:
a searching unit that searches the supporting information from a database in accordance with the model included in the dictionary and a primary reconfiguring unit that adds the searched supporting information to the job-site data to reconfigure the event information; and
searching other kinds of supporting information with search keys that are the job-site data and the supporting information included in the event information reconfigured by the primary reconfiguring unit, and successively adding the successively searched supporting information to the event information, the secondary reconfiguring unit comprising:
a secondary reconfiguring unit that extracts some of information from the event information reconfigured by the primary reconfiguring unit in accordance with the collection condition information to generate newly reconfigured event information; and
a transmitting unit that transmits the event information reconfigured by the secondary reconfiguring unit to the client terminal.

9. The information collecting system according to claim 8, wherein
the dictionary generating unit adds the reference mask to the different model depending on the domain managing device to generate an individual dictionary for each domain managing device, and
the client terminal generates the collection condition information based on the distributed individual dictionary received by the predetermined domain managing device.

10. The information collecting system according to claim 8, wherein
the dictionary generating unit of the dictionary managing device further adds a managing mask to some of the models in the individual dictionary for each domain managing device, and
the domain managing device includes an input unit, and a dictionary correcting unit that corrects the model in the distributed individual dictionary in response to an operation given from the input unit, and
the dictionary correcting unit receives an operation given through the input unit that is a correction of only the model not added with the managing mask.

11. The information collecting system according to claim 10, wherein the dictionary generating unit adds the managing mask to the different model depending on the domain managing device to generate an individual dictionary for each domain managing device.

12. An information collecting system to enable selective domain management of a performance at a job-site by a plurality of managing devices that can respond to error information and status information which includes a dictionary managing device, a plurality of secondary managing devices, a plurality of secondary reconfiguring devices, and a plurality of primary reconfiguring devices, and which is connected to, via a network, a plurality of data generating devices that generate job-site data and a plurality of client terminals that request collection of event information, the dictionary managing device comprising:

a managing unit that stores a dictionary recording all models of all event information derived from the job-site data output by all data generating devices;
a dictionary generating unit that adds, for each performance domain managing device, a reference mask to some models in the dictionary stored in the managing unit in order to generate an individual dictionary for each domain managing device to execute a decision; and
a transmitting unit that distributes the corresponding dictionary added with the reference mask to the domain managing device, the domain managing device comprising:
a display control unit that causes a predetermined client terminal to display the model which is included in the distributed dictionary and which is not hidden by the reference mask and causing the client terminal to generate collection condition information for the event information based on the displayed model, the primary reconfiguring unit comprising:
a searching unit that searches the supporting information from a database in accordance with the model included in the dictionary and a primary reconfiguring unit that adds the searched supporting information to the job-site data to reconfigure the event information and searching other kinds of supporting information with search keys that are the job-site data and the supporting information included in the event information reconfigured by the primary reconfiguring unit, and successively adding the successively searched supporting information to the event information,
wherein the supporting information is background information that includes at least one piece of information respectively indicating an editing assist material which is necessary for editing the job-site data, a comparison target data to be compared with the job-site data, an analysis assist material which affects an analysis and an evaluation assist material which affects an evaluation on an analysis result, and
a secondary reconfiguring unit that extracts some of information from the event information reconfigured by the primary reconfiguring unit in accordance with the collection condition information to generate newly reconfigured event information; and
a transmitting unit that transmits the event information reconfigured by the secondary reconfiguring unit to the client terminal.

13. The information collecting system according to claim 12, wherein
the dictionary generating unit adds the reference mask to the different model depending on the domain managing device to generate an individual dictionary for each domain managing device, and
the client terminal generates the collection condition information based on the distributed individual dictionary received by the predetermined domain managing device.

14. The information collecting system according to claim 13, wherein
the dictionary generating unit of the dictionary managing device further adds a managing mask to some of the models in the individual dictionary for each domain managing device, and
the domain managing device includes an input unit, and a dictionary correcting unit that corrects the model in the distributed individual dictionary in response to an operation given from the input unit, and the dictionary correcting unit receives an operation given through the input unit that is a correction of only the model not added with the managing mask.

15. The information collecting system according to claim 14, wherein the dictionary generating unit adds the managing mask to the different model depending on the domain managing device to generate an individual dictionary for each domain managing device.

16. The information collecting system according to claim 14, wherein the job-site data is a characteristic in a fishbone diagram, the background information is a factor in the fishbone diagram which includes the job-site data as the characteristic.

* * * * *